(12) United States Patent
Li et al.

(10) Patent No.: US 10,841,068 B2
(45) Date of Patent: Nov. 17, 2020

(54) DL HARQ TIMING IN TDD WITH 1 MS TTI AND REDUCED PROCESSING TIME

(71) Applicant: Telefonaktiebolaget LM Ericsson (publ), Stockholm (SE)

(72) Inventors: Jingya Li, Gothenburg (SE); Laetitia Falconetti, Järfälla (SE); Daniel Larsson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/323,617

(22) PCT Filed: Aug. 10, 2017

(86) PCT No.: PCT/IB2017/054894
§ 371 (c)(1),
(2) Date: Feb. 6, 2019

(87) PCT Pub. No.: WO2018/029637
PCT Pub. Date: Feb. 15, 2018

(65) Prior Publication Data
US 2019/0182011 A1    Jun. 13, 2019

Related U.S. Application Data

(60) Provisional application No. 62/374,435, filed on Aug. 12, 2016.

(51) Int. Cl.
*H04L 5/00* (2006.01)
*H04L 5/14* (2006.01)
*H04L 1/18* (2006.01)

(52) U.S. Cl.
CPC .......... *H04L 5/0055* (2013.01); *H04L 1/1812* (2013.01); *H04L 1/1854* (2013.01); *H04L 5/1469* (2013.01)

(58) Field of Classification Search
CPC ... H04L 5/0055; H04L 1/1812; H04L 1/1854; H04L 5/1469
See application file for complete search history.

(56) References Cited

U.S. PATENT DOCUMENTS

| | | | |
|---|---|---|---|
| 2009/0181689 A1* | 7/2009 | Lee | H04L 5/0044 |
| | | | 455/450 |
| 2010/0182939 A1* | 7/2010 | Ojala | H04L 5/0091 |
| | | | 370/280 |

(Continued)

FOREIGN PATENT DOCUMENTS

| | | |
|---|---|---|
| EP | 3043502 A1 | 7/2016 |
| EP | 3076734 A1 | 10/2016 |

(Continued)

OTHER PUBLICATIONS

Author Unknown, "Technical Specification Group Radio Access Network; Evolved Universal Terrestrial Radio Access (E-UTRA); Physical channels and modulation (Release 13)," Technical Specification 36.211, Version 13.0.0, 3GPP Organizational Partners, Dec. 2015, 141 pages.

(Continued)

*Primary Examiner* — Jael M Ulysse
(74) *Attorney, Agent, or Firm* — Withrow & Terranova, PLLC

(57) ABSTRACT

Systems and methods for determining and utilizing downlink Hybrid Automatic Repeat Request (HARQ) timing for reduced processing time are disclosed. In some embodiments, a method of operation of a wireless device in a cellular communications network comprises determining, based on a Time Division Duplexing (TDD) uplink/downlink configuration, a downlink HARQ timing value k for transmission of downlink HARQ feedback for a downlink transmission received in a downlink Transmission Time Interval (TTI) $n_{DL}$. The method further comprises transmit- (Continued)

ting, in an uplink TTI $n_{UL}=n_{DL}+k$, the downlink HARQ feedback for the downlink transmission received in the downlink TTI $n_{DL}$. For at least some combinations of values for $n_{UL}$ and TDD uplink/downlink configurations, k<4. In this manner, HARQ timing is provided for reduced processing time.

30 Claims, 19 Drawing Sheets

(56) References Cited

U.S. PATENT DOCUMENTS

| | | | |
|---|---|---|---|
| 2013/0223298 A1* | 8/2013 | Ahn | H04L 1/0083 370/280 |
| 2013/0272169 A1* | 10/2013 | Wang | H04L 1/1822 370/280 |
| 2013/0301490 A1* | 11/2013 | He | H04W 76/18 370/280 |
| 2014/0029490 A1* | 1/2014 | Kim | H04L 5/0073 370/280 |
| 2014/0092789 A1* | 4/2014 | Lei | H04J 3/1694 370/280 |
| 2014/0092794 A1* | 4/2014 | Yang | H04B 7/2656 370/280 |
| 2014/0112217 A1* | 4/2014 | Ahn | H04B 7/2656 370/280 |
| 2014/0269451 A1* | 9/2014 | Papasakellariou | H04B 7/2656 370/280 |
| 2014/0293843 A1* | 10/2014 | Papasakellariou | H04L 1/00 370/280 |
| 2015/0208407 A1* | 7/2015 | Yang | H04L 5/1469 370/280 |
| 2015/0244485 A1* | 8/2015 | Nguyen | H04W 74/002 370/280 |
| 2015/0365965 A1* | 12/2015 | Wu | H04L 1/1812 370/328 |
| 2016/0013902 A1* | 1/2016 | Cui | H04L 5/0048 370/329 |
| 2016/0020891 A1* | 1/2016 | Jung | H04W 72/0446 370/280 |
| 2016/0021659 A1* | 1/2016 | Yang | H04W 72/0413 370/280 |
| 2016/0119948 A1* | 4/2016 | Damnjanovic | H04W 72/14 370/280 |
| 2016/0182213 A1* | 6/2016 | Golitschek Edler von Elbwart | H04L 5/22 370/294 |
| 2016/0198461 A1* | 7/2016 | Su | H04W 52/0251 370/329 |
| 2016/0360550 A1 | 12/2016 | Chen et al. | |
| 2017/0223702 A1 | 8/2017 | Yin et al. | |
| 2017/0332365 A1 | 11/2017 | Lin et al. | |
| 2017/0332386 A1 | 11/2017 | Li et al. | |
| 2018/0376497 A1 | 12/2018 | You et al. | |
| 2019/0104520 A1 | 4/2019 | Kim et al. | |
| 2019/0191434 A1 | 6/2019 | Hugl et al. | |

FOREIGN PATENT DOCUMENTS

| | | |
|---|---|---|
| WO | 2012171553 A1 | 12/2012 |
| WO | 2014089107 A1 | 6/2014 |
| WO | 2015079926 A1 | 6/2015 |
| WO | 2015100136 A1 | 7/2015 |
| WO | 2018029634 A1 | 2/2018 |
| WO | 2018029636 A1 | 2/2018 |

OTHER PUBLICATIONS

Author Unknown, "Technical Specification Group Radio Access Network; Evolved Universal Terrestrial Radio Access (E-UTRA); Physical layer procedures (Release 13)," Technical Specification 36.213, Version 13.0.1, 3GPP Organizational Partners, Jan. 2016, 326 pages.
CMCC, "R1-164884: Discussion on PUSCH transmission for UpPTS," Third Generation Partnership Project (3GPP), TSG RAN WG1 Meeting #85, May 23-27, 2016, 3 pages, Nanjing, China.
CMCC, "R1-164885: Discussion on latency reduction for TDD," Third Generation Partnership Project (3GPP), TSG RAN WG1 Meeting #85, May 23-27, 2016, 3 pages, Nanjing, China.
Ericsson, "R1-163326: On processing time reduction and related procedures," Third Generation Partnership Project (3GPP), TSG RAN WG1 Meeting #84 bis, Apr. 11-15, 2016, 6 pages, Busan.
Ericsson, "R1-167495: TDD aspects of short TTI," Third Generation Partnership Project (3GPP), TSG-RAN WG1 #86, Aug. 22-26, 2016, 3 pages, Goteborg, Sweden.
Ericsson, "R1-167501: Supported HARQ timings for 1ms TTI and reduced processing time," Third Generation Partnership Project (3GPP), TSG-RAN WG1 #86, Aug. 22-26, 2016, 3 pages, Goteborg, Sweden.
Ericsson, "R1-1708868: FS2 aspects of short TTI," Third Generation Partnership Project (3GPP), TSG-RAN WG1 Meeting #89, May 15-19, 2017, 5 pages, Hangzhou, P.R. China.
Huawei, et al., "R1-162115: Short TTI for UL transmissions," Third Generation Partnership Project (3GPP), TSG RAN WG1 Meeting #84bis, Apr. 11-15, 2016, 4 pages, Busan, Korea.
Nokia Networks, "R1-157292: On Shorter TTI for Latency Reduction," Third Generation Partnership Project (3GPP), TSG-RAN WG1 Meeting #83, Nov. 15-22, 2015, 4 pages, Anaheim, USA.
Samsung, "R1-156822: Study on specification impact for uplink due to TTI shortening," Third Generation Partnership Project (3GPP), TSG RAN WG1 #83, Nov. 15-22, 2015, 3 pages, Anaheim, USA.
International Search Report and Written Opinion for International Patent Application No. PCT/IB2017/054891, dated Nov. 10, 2017, 19 pages.
Written Opinion for International Patent Application No. PCT/IB2017/054891, dated Jul. 16, 2018, 6 pages.
International Preliminary Report on Patentability for International Patent Application No. PCT/IB2017/054891, dated Nov. 6, 2018, 10 pages.
International Search Report and Written Opinion for International Patent Application No. PCT/IB2017/054893, dated Dec. 1, 2017, 21 pages.
Written Opinion for International Patent Application No. PCT/IB2017/054893, dated Jul. 4, 2018, 10 pages.
International Preliminary Report on Patentability for International Patent Application No. PCT/IB2017/054893, dated Nov. 9, 2018, 9 pages.
International Search Report and Written Opinion for International Patent Application No. PCT/IB2017/054894, dated Nov. 16, 2017, 18 pages.
Written Opinion for International Patent Application No. PCT/IB2017/054894, dated Jul. 13, 2018, 6 pages.
International Preliminary Report on Patentability for International Patent Application No. PCT/IB2017/054894, dated Nov. 19, 2018, 33 pages.
Non-Final Office Action for U.S. Appl. No. 16/323,605, dated Mar. 17, 2020, 19 pages.
Non-Final Office Action for U.S. Appl. No. 16/323,590, dated May 14, 2020, 17 pages.
Intention to Grant for European Patent Application No. 17768232.5, dated May 11, 2020, 111 pages.
Intention to Grant for European Patent Application No. 17767927.1, dated May 27, 2020, 115 pages.
Final Office Action and Applicant-Initiated Interview Summary for U.S. Appl. No. 16/323,605, dated Aug. 19, 2020, 21 pages.

* cited by examiner $k_0$ = 3 OR 2MS, UpPTS IS NOT USED FOR SENDING DL HARQ-ACK, DL HARQ-TIMING FOR TDD DL/UL CONFIGURATION 0

$k_0$ = 4, 3 OR 2MS, DL HARQ-TIMING FOR TDD DL/UL CONFIGURATION 0, UpPTS IS USED FOR SENDING DL HARQ-ACK, DL HARQ-TIMING FOR TDD DL/UL CONFIGURATION 0

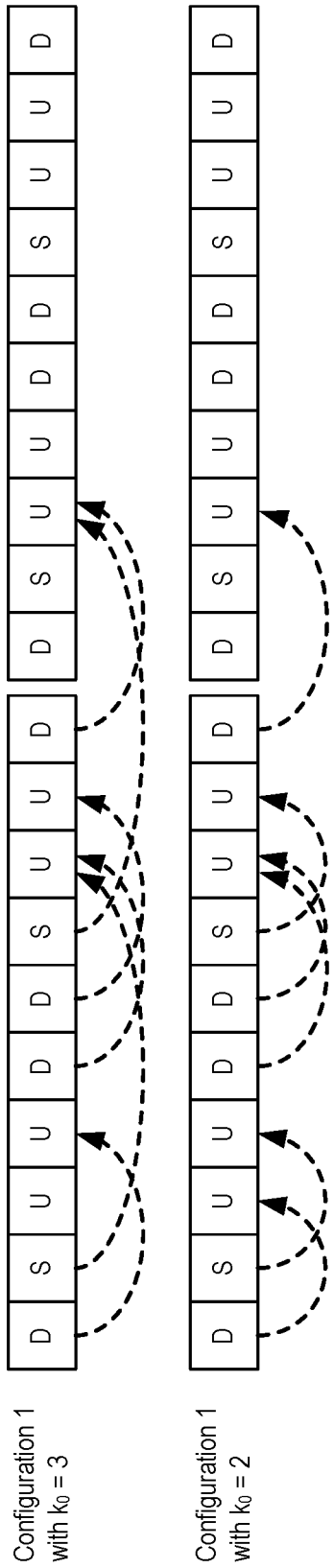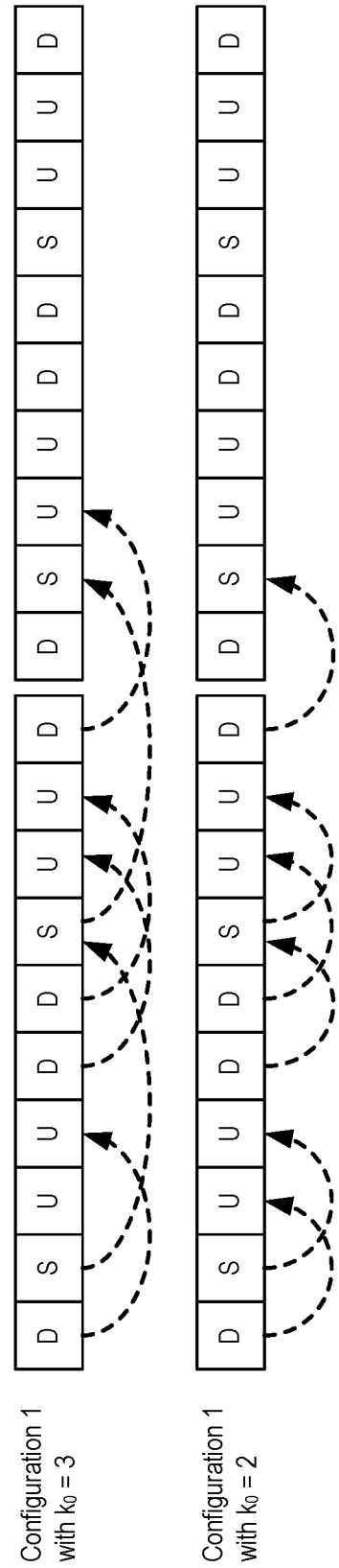

$k_0 = 4$ MS, UpPTS IS USED FOR SENDING DL HARQ-ACK, DL HARQ-TIMING FOR TDD DL/UL CONFIGURATION $k_0 = 3$ OR 2MS, UpPTS IS NOT USED FOR SENDING DL HARQ-ACK, DL HARQ-TIMING FOR TDD DL/UL CONFIGURATION 2

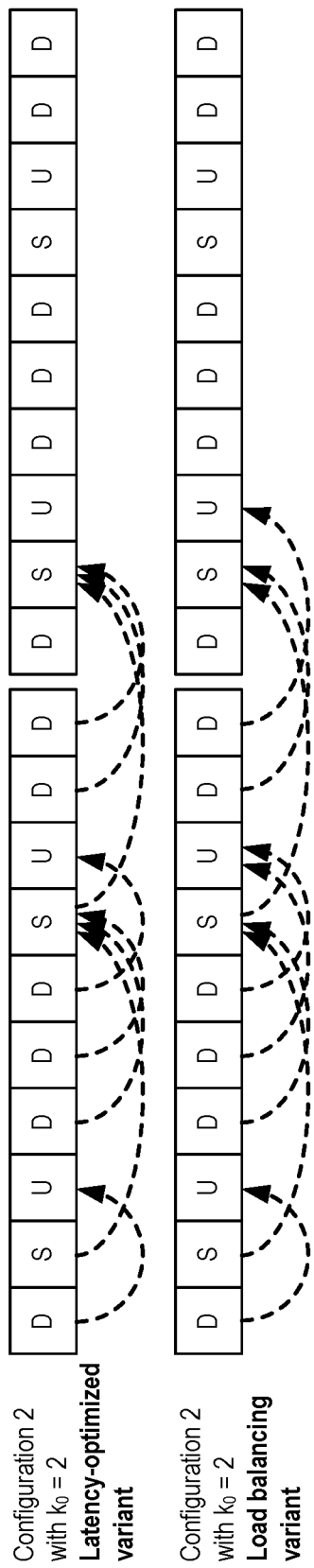
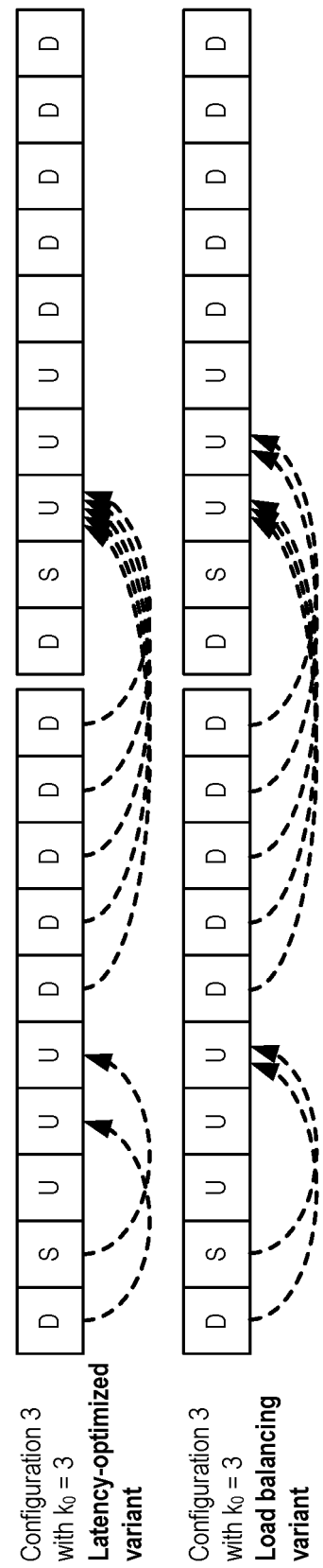
FIG. 11
FIG. 12

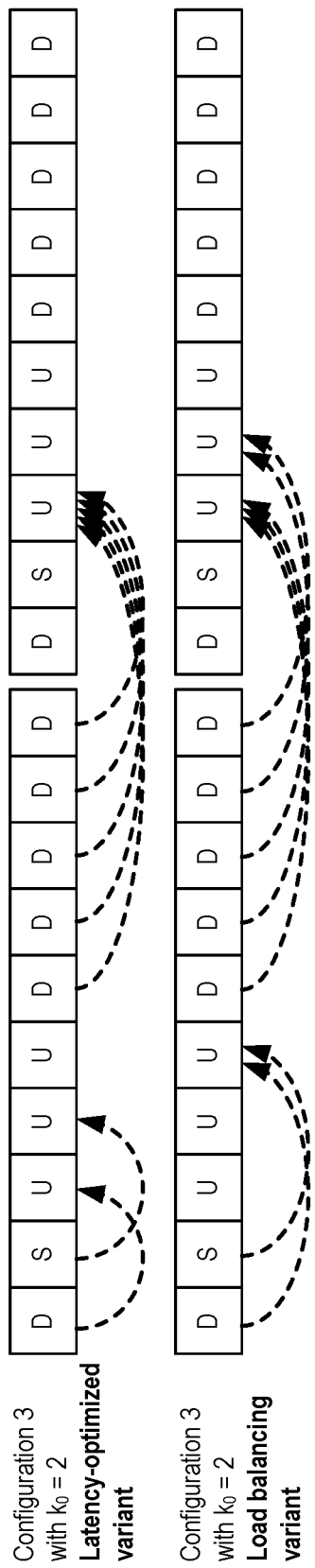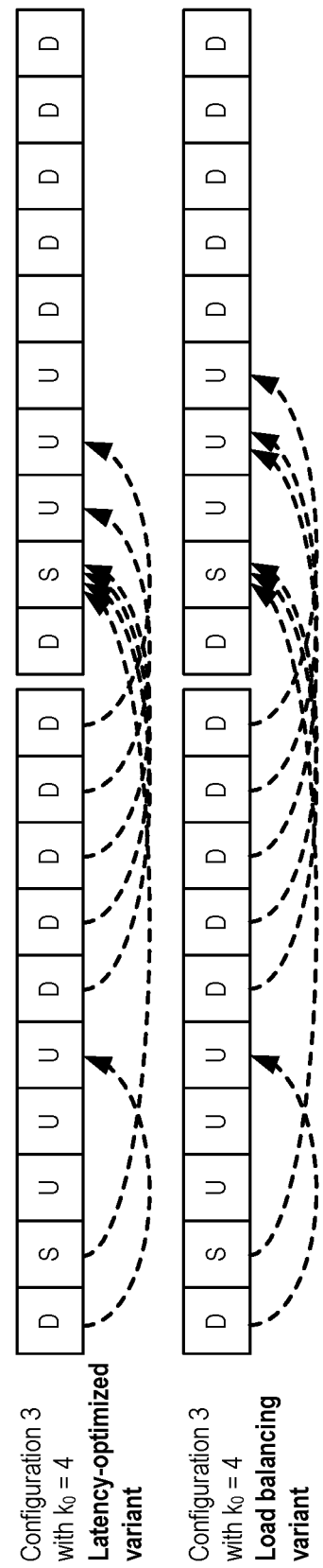

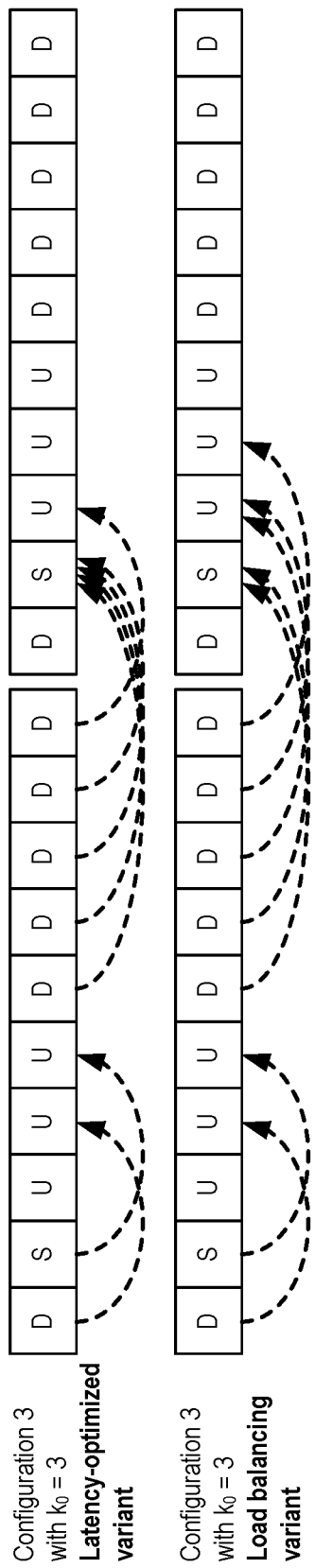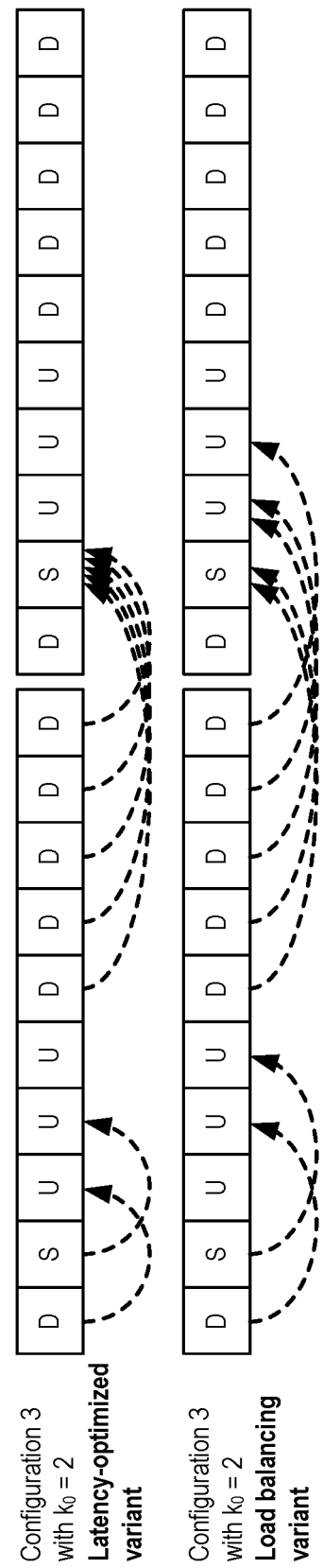
FIG. 15
FIG. 16

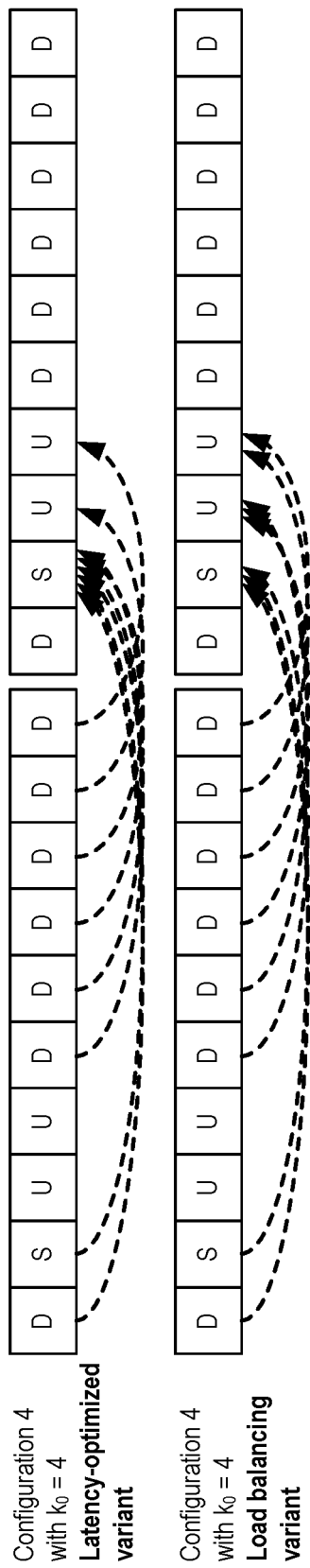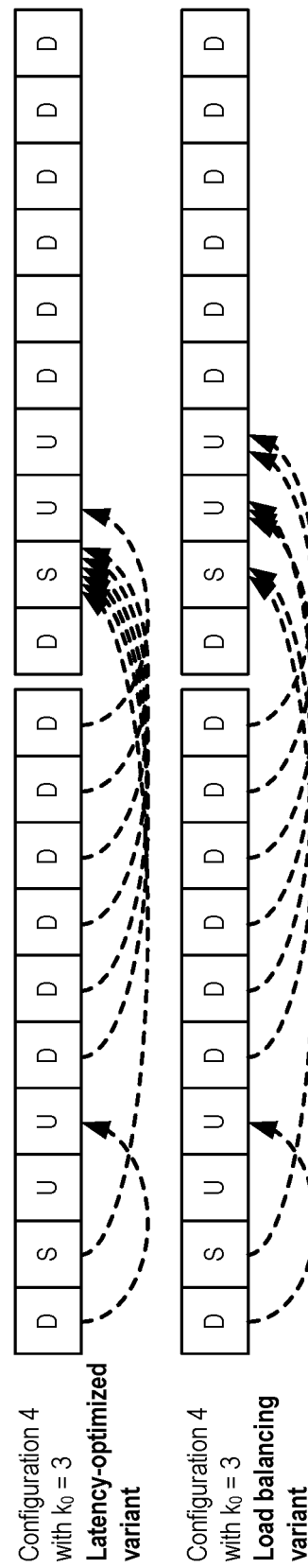

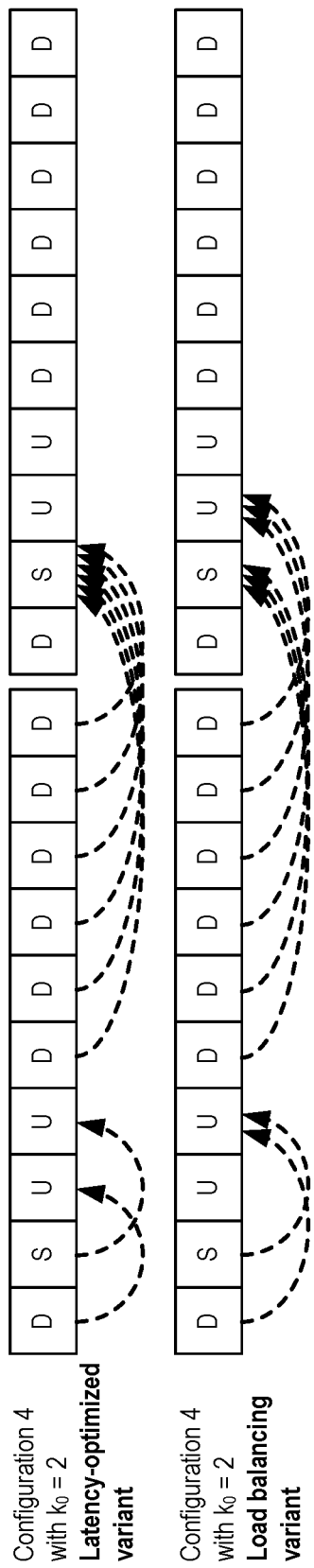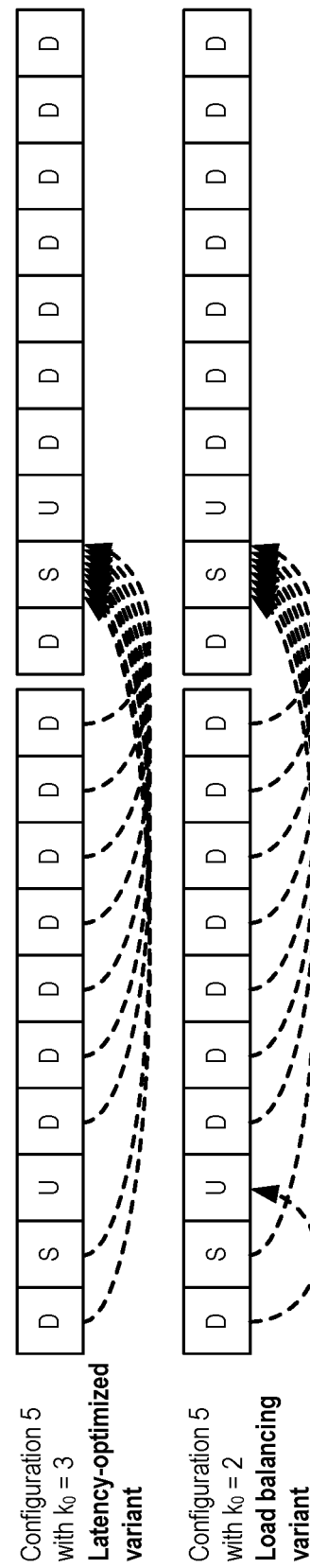

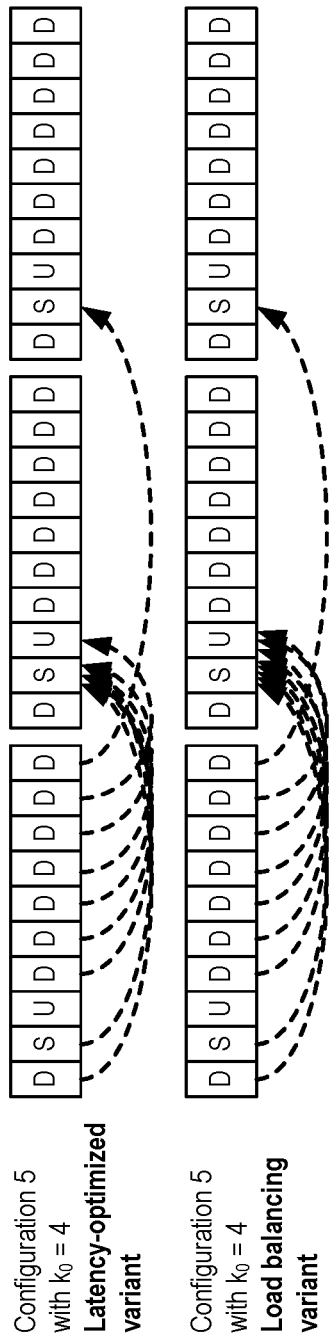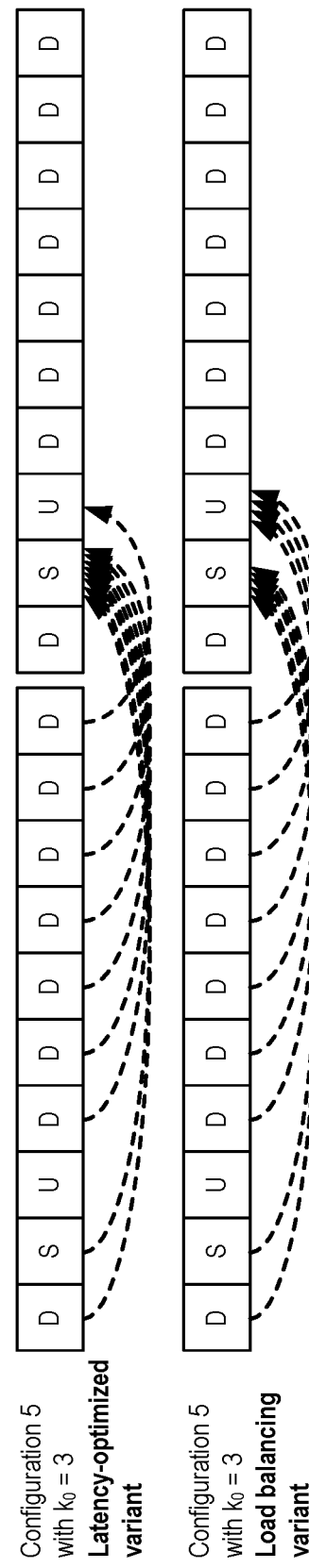

$k_0 = 2$, UpPTS IS USED FOR SENDING DL HARQ-ACK, DL HARQ-TIMING FOR TDD DL/UL CONFIGURATION 5

$k_0 = 3$, UpPTS IS NOT USED FOR SENDING DL HARQ-ACK, DL HARQ-TIMING FOR TDD DL/UL CONFIGURATION 6

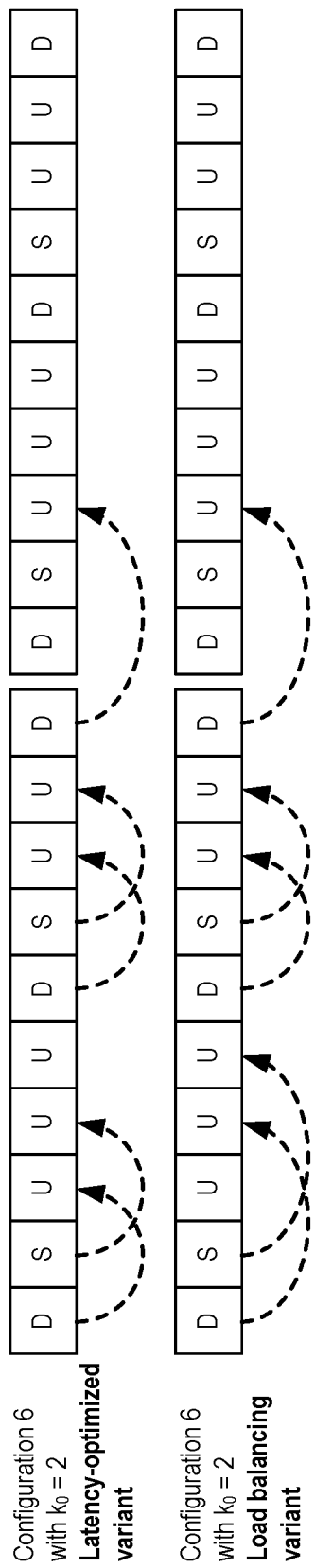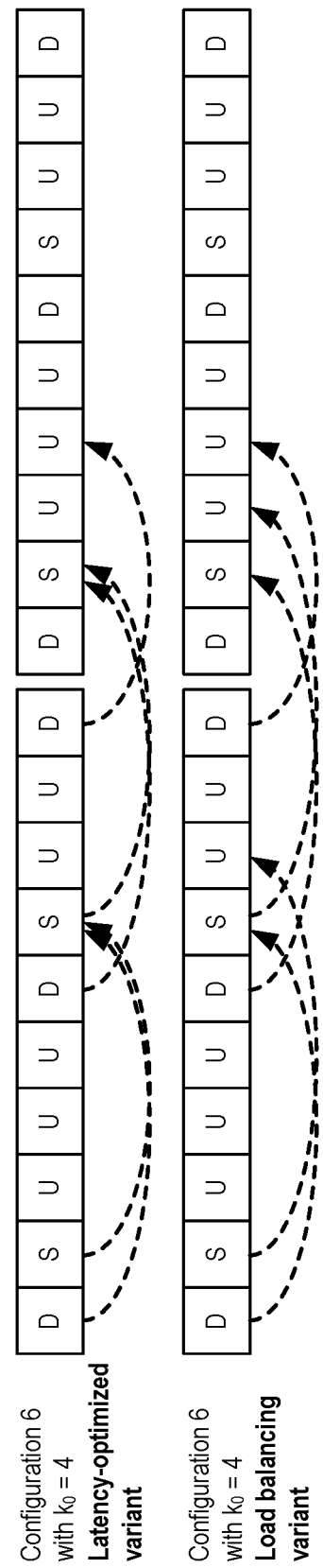
FIG. 27
$k_0 = 2$, UpPTS IS NOT USED FOR SENDING DL HARQ-ACK, DL HARQ-TIMING FOR TDD DL/UL CONFIGURATION 6
FIG. 28
$K_0 = 4$, UpPTS IS USED FOR SENDING DL HARQ-ACK, DL HARQ-TIMING FOR TDD DL/UL CONFIGURATION 6

$k_0 = 3$ OR 2, UpPTS IS USED FOR SENDING DL HARQ-ACK, DL HARQ-TIMING FOR TDD DL/UL CONFIGURATION 6

HARQ FEEDBACK DELAY FOR CONFIGURATION 1 WITH $K_0 = 3$ WITH AND WITHOUT THE POSSIBILITY TO USE UpPTS TO SEND HARQ FEEDBACK

DL HARQ TIMING IN TDD WITH 1 MS TTI AND REDUCED PROCESSING TIME

RELATED APPLICATIONS

This application is a 35 U.S.C. § 371 national phase filing of International Application No. PCT/IB2017/054894, filed Aug. 10, 2017, which claims the benefit of provisional patent application Ser. No. 62/374,435, filed Aug. 12, 2016, the disclosures of which are hereby incorporated herein by reference in their entireties.

TECHNICAL FIELD

The present disclosure relates to downlink Hybrid Automatic Repeat Request (HARQ) timing.

BACKGROUND

In Third Generation Partnership Project (3GPP) Technical Specification (TS) 36.211, three radio frame structures are supported. Frame Structure (FS) type 1 (FS 1) is applicable to Frequency Division Duplexing (FDD) only, FS type 2 (FS 2) is applicable to Time Division Duplexing (TDD) only, and FS type 3 (FS 3) is applicable to License Assisted Access (LAA) secondary cell operation only.

With FS 2 for TDD, each radio frame of length 10 milliseconds (ms) consists of two half-frames of length 5 ms each. Each half-frame consists of five Subframes (SFs) of length 1 ms. Each SF is defined by two slots of length 0.5 ms each. Within each radio frame, a subset of SFs are reserved for uplink transmissions, and the remaining SFs are allocated for downlink transmissions, or for special SFs, where the switch between downlink and uplink occurs.

As shown in Table 1, copied from 3GPP TS 36.211 V13.0.0, seven different downlink/uplink configurations are supported for FS 2. Here, "D" denotes a downlink SF, "U" denotes an uplink SF, and "S" represents a special SF. Configurations 0, 1, 2, and 6 have 5 ms downlink-to-uplink switch-point periodicity, with the special SF existing in both SF 1 and SF 6. Configurations 3, 4, and 5 have 10 ms downlink-to-uplink switch-point periodicity, with the special SF in SF 1 only.

TABLE 1

| | | Downlink/Uplink Configurations | | | | | | | | | |
|---|---|---|---|---|---|---|---|---|---|---|---|
| DL/UL Config-uration | DL-to-UL Switch-point periodicity | SF number | | | | | | | | | |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

A special SF is split into three parts: a Downlink Part of a Special Subframe (DwPTS), GP (Guard Period), and an Uplink Part of a Special Subframe (UpPTS). The DwPTS with duration of more than three symbols can be treated as a normal downlink SF for data transmission. However, the UpPTS is not used for data transmission due to the very short duration in the first releases of Long Term Evolution (LTE). Instead, UpPTS can be used for channel sounding or random access. In LTE Release 14 the possibility of using UpPTS for data transmission will be specified for a specific special SF configuration.

Typically, the downlink/uplink configuration and the configuration of the special SF used in a cell are signaled as part of the system information, which is included in System Information Block 1 (SIB1) and broadcasted every 80 ms within SF 5.

Hybrid Automatic Repeat Request (HARQ) timing is defined as the time relation between the reception of data in a certain HARQ process and the transmission of the HARQ acknowledgement. Based on this timing, the receiver is able to know to which HARQ process a received acknowledgement is associated.

In TDD, an uplink HARQ acknowledgement is only allowed to be transmitted in uplink SF, and a downlink HARQ acknowledgement is only possible in Physical HARQ Indicator Channel (PHICH) of downlink SF and DwPTS. The HARQ acknowledgement of a transport block in SF n is transmitted in SF n+k, where k≥4. The value of k depends on the downlink/uplink configuration, and is given in Table 2 and Table 3 for downlink and uplink transmissions, respectively [3GPP TS 36.213 V13.0.1].

TABLE 2

| HARQ Timing k for Downlink Transmissions | | | | | | | | | | |
|---|---|---|---|---|---|---|---|---|---|---|
| TDD DL/UL configuration | SF index n | | | | | | | | | |
| | 0 | 1 | 2 | 3 | 4 | 5 | 6 | 7 | 8 | 9 |
| 0 | 4 | 6 | — | — | — | 4 | 6 | — | — | — |
| 1 | 7 | 6 | — | — | 4 | 7 | 6 | — | — | 4 |
| 2 | 7 | 6 | — | 4 | 8 | 7 | 6 | — | 4 | 8 |
| 3 | 4 | 11 | — | — | — | 7 | 6 | 6 | 5 | 5 |
| 4 | 12 | 11 | — | — | 8 | 7 | 7 | 6 | 5 | 4 |
| 5 | 12 | 11 | — | 9 | 8 | 7 | 6 | 5 | 4 | 13 |
| 6 | 7 | 7 | — | — | — | 7 | 7 | — | — | 5 |

TABLE 3

| HARQ Timing k for Uplink Transmissions | | | | | | | | | | |
|---|---|---|---|---|---|---|---|---|---|---|
| TDD DL/UL configuration | SF index n | | | | | | | | | |
| | 0 | 1 | 2 | 3 | 4 | 5 | 6 | 7 | 8 | 9 |
| 0 | — | — | 4 | 7 | 6 | — | — | 4 | 7 | 6 |
| 1 | — | — | 4 | 6 | — | — | — | 4 | 6 | — |
| 2 | — | — | 6 | — | — | — | — | 6 | — | — |
| 3 | — | — | 6 | 6 | 6 | — | — | — | — | — |
| 4 | — | — | 6 | 6 | — | — | — | — | — | — |
| 5 | — | — | 6 | — | — | — | — | — | — | — |
| 6 | — | — | 4 | 6 | 6 | — | — | 4 | 7 | — |

Uplink scheduling timing refers to the time relation between a received uplink grant in downlink SF n and the uplink transmission in uplink SF n+l.

In TDD, the value of l depends on the downlink/uplink configuration. For downlink/uplink configurations 1-6, the values of l are given in Table 4, copied from Table 8-2 in 3GPP TS 36.213 V13.0.1.

For downlink/uplink configuration 0, the value of l also depends on the Uplink Index (UI) field of the uplink Downlink Control Information (DCI) transmitted in downlink SF n:

If the Most Significant Bit (MSB) (i.e., the left-most bit) of the UI is set to 1, the value of l is obtained from Table 4;

If the Least Significant Bit (LSB) (i.e., the right-most bit) of the UI is set to 1, the value of 1 is 7;

If both the MSB and the LSB of the UI are set to 1, the value of 1 is 7 and the value obtained from Table 4.

Table 5 gives the uplink scheduling timing table for TDD downlink/uplink configuration 0.

TABLE 4

Uplink Scheduling for Timing 1 for Uplink Retransmissions

| TDD DL/UL configuration | SF index n | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | | 4 | 6 | | |
| 1 | | | 6 | | | 4 | | 6 | | 4 |
| 2 | | | | | 4 | | | | 4 | |
| 3 | 4 | | | | | | | | 4 | 4 |
| 4 | | | | | | | | | 4 | 4 |
| 5 | | | | | | | | | 4 | |
| 6 | | 7 | 7 | | | | | 7 | 7 | 5 |

TABLE 5

Uplink Scheduling for Timing 1 for
TDD Uplink/Downlink Configuration 0

| UL index | DL/special SF | UL timing, 1 | Scheduled UL SF index |
|---|---|---|---|
| 10 | 0 | 4 | 4 |
| | 1 | 6 | 7 |
| | 5 | 4 | 9 |
| | 6 | 6 | 2 |
| 01 | 0 | 7 | 7 |
| | 1 | 7 | 8 |
| | 5 | 7 | 2 |
| | 6 | 7 | 3 |
| 11 | 0 | 4, 7 | 4, 7 |
| | 1 | 6, 7 | 7, 8 |
| | 5 | 4, 7 | 9, 2 |
| | 6 | 6, 7 | 2, 3 |

Packet data latency is one of the performance metrics that vendors, operators, and also end-users (via speed test applications) regularly measure. Latency measurements are done in all phases of a radio access network system lifetime, when verifying a new software release or system component, when deploying a system, and when the system is in commercial operation.

Shorter latency than previous generations of 3GPP Radio Access Technologies (RATs) was one performance metric that guided the design of LTE. LTE is also now recognized by the end-users to be a system that provides faster access to the Internet and lower data latencies than previous generations of mobile radio technologies.

Packet data latency is important not only for the perceived responsiveness of the system; it is also a parameter that indirectly influences the throughput of the system. Hypertext Transfer Protocol (HTTP)/Transmission Control Protocol (TCP) is the dominating application and transport layer protocol suite used on the Internet today. According to HTTP Archive (http://httparchive.org/trends.php), the typical size of HTTP based transactions over the Internet are in the range of a few tens of kilobytes up to one megabyte. In this size range, the TCP slow start period is a significant part of the total transport period of the packet stream. During TCP slow start the performance is latency limited. Hence, improved latency can rather easily be showed to improve the average throughput for this type of TCP based data transactions.

Radio resource efficiency could be positively impacted by latency reductions. Lower packet data latency could increase the number of transmissions possible within a certain delay bound; hence, higher Block Error Rate (BLER) targets could be used for the data transmissions freeing up radio resources potentially improving the capacity of the system.

One key factor to achieve packet latency reductions is the reduction of processing time for data and control signaling. In LTE Release 8, a downlink Transmission Time Interval (TTI) n corresponds to one SF of length 1 ms and it requires 3 ms for the User Equipment device (UE) to detect the downlink assignment, decode the downlink data, and prepare the HARQ feedback to be sent in uplink. The HARQ feedback in uplink is then sent in the uplink TTI n+4. This is valid for FDD. For TDD, the timing is minimum n+4 but can be later depending on the TDD uplink/downlink configuration. The exact HARQ timing for TDD is given in form of tables in the specifications as mentioned earlier. Similarly, if the enhanced or evolved Node B (eNB) sends an uplink grant in the downlink TTI n, the uplink transmission occurs in uplink TTI n+4 in FDD, or n+4 or later for TDD.

SUMMARY

Systems and methods that relate to downlink Hybrid Automatic Repeat Request (HARQ) timing for reduced processing time are disclosed. In some embodiments, a method of operation of a wireless device in a cellular communications network comprises determining, based on a Time Division Duplexing (TDD) uplink/downlink configuration, a downlink HARQ timing value k for transmission of downlink HARQ feedback for a downlink transmission received in a downlink Transmission Time Interval (TTI) $n_{DL}$. The method further comprises transmitting, in an uplink TTI $n_{UL}=n_{DL}+k$, the downlink HARQ feedback for the downlink transmission received in the downlink TTI $n_{DL}$. For at least some combinations of values for $n_{UL}$ and TDD uplink/downlink configurations, k<4. In this manner, HARQ timing is provided for reduced processing time.

In some embodiments, the downlink HARQ timing value k is a smallest integer number of TTIs that is larger than or equal to a predefined minimum downlink HARQ timing value such that TTI $n_{DL}+k$ is an uplink TTI. Further, in some embodiments, the predefined minimum downlink HARQ timing value is 2. In some other embodiments, the predefined minimum downlink HARQ timing value is 3.

In some embodiments, determining the downlink HARQ timing value k comprises determining the downlink HARQ timing value k in such a manner that an uplink part of special Subframes (SFs) are treated as uplink TTIs. In some other embodiments, determining the downlink HARQ timing value k comprises determining the downlink HARQ timing value k in such a manner that an uplink part of special SFs are not treated as uplink TTIs.

In some embodiments, the TDD uplink/downlink configuration is Long Term Evolution (LTE) TDD uplink/downlink configuration 0, and determining the downlink HARQ timing value k comprises determining the downlink HARQ timing value k such that the downlink HARQ timing value k is 3 if $n_{UL}$ is equal to 3, the downlink HARQ timing value k is 3 if $n_{UL}$ is equal to 4, the downlink HARQ timing value k is 3 if $n_{UL}$ is equal to 8, and the downlink HARQ timing value k is 3 if $n_{UL}$ is equal to 9.

In some embodiments, the TDD uplink/downlink configuration is LTE TDD uplink/downlink configuration 1, and determining the downlink HARQ timing value k comprises determining the downlink HARQ timing value k such that the downlink HARQ timing value k is 3 or 6 if $n_{UL}$ is equal to 2, the downlink HARQ timing value k is 3 if $n_{UL}$ is equal to 3, the downlink HARQ timing value k is 3 or 6 if $n_{UL}$ is equal to 7, and the downlink HARQ timing value k is 3 if $n_{UL}$ is equal to 8.

In some embodiments, the TDD uplink/downlink configuration is LTE TDD uplink/downlink configuration 2, and determining the downlink HARQ timing value k comprises determining the downlink HARQ timing value k such that the downlink HARQ timing value k is 3, 4, 6, or 7 if $n_{UL}$ is equal to 2 and the downlink HARQ timing value k is 3, 4, 6, or 7 if $n_{UL}$ is equal to 7.

In some embodiments, the TDD uplink/downlink configuration is LTE TDD uplink/downlink configuration 3, and determining the downlink HARQ timing value k comprises determining the downlink HARQ timing value k such that the downlink HARQ timing value k is 5, 6, or 7 if $n_{UL}$ is equal to 2, the downlink HARQ timing value k is 4 or 5 if $n_{UL}$ is equal to 3, and the downlink HARQ timing value k is 3 or 4 if $n_{UL}$ is equal to 4.

In some embodiments, the TDD uplink/downlink configuration is LTE TDD uplink/downlink configuration 4, and determining the downlink HARQ timing value k comprises determining the downlink HARQ timing value k such that the downlink HARQ timing value k is 6, 7, 8, or 11 if $n_{UL}$ is equal to 2 and the downlink HARQ timing value k is 3, 4, 5, or 6 if $n_{UL}$ is equal to 3.

In some embodiments, the TDD uplink/downlink configuration is LTE TDD uplink/downlink configuration 5, and determining the downlink HARQ timing value k comprises determining the downlink HARQ timing value k such that the downlink HARQ timing value k is 3, 4, 5, 6, 7, 8, 9, 11, or 12 if $n_{UL}$ is equal to 2.

In some embodiments, the TDD uplink/downlink configuration is LTE TDD uplink/downlink configuration 6, and determining the downlink HARQ timing value k comprises determining the downlink HARQ timing value k such that the downlink HARQ timing value k is 3 or 6 if $n_{UL}$ is equal to 2, the downlink HARQ timing value k is 3 if $n_{UL}$ is equal to 3, the downlink HARQ timing value k is 3 if $n_{UL}$ is equal to 4, and the downlink HARQ timing value k is 3 if $n_{UL}$ is equal to 8.

In some embodiments, each of the downlink TTI and the uplink TTI is a 1 millisecond (ms) TTI.

Embodiments of a wireless device are also disclosed. In some embodiments, a wireless device for a cellular communications network is adapted to determine, based on a TDD uplink/downlink configuration, a downlink HARQ timing value k for transmission of downlink HARQ feedback for a downlink transmission received in a downlink TTI $n_{DL}$. The wireless device is further adapted to transmit, in an uplink TTI $n_{UL}=n_{DL}+k$, the downlink HARQ feedback for the downlink transmission received in the downlink TTI $n_{DL}$. For at least some combinations of values for $n_{UL}$ and TDD uplink/downlink configurations, k<4.

In some embodiments, the wireless device is further adapted to perform the method of operation of a wireless device according to any other embodiments of the method of operation of a wireless device disclosed herein.

In some embodiments, a wireless device for a cellular communications network comprises at least one transceiver, at least one processor, and memory comprising instructions executable by the at least one processor whereby the wireless device is operable to: determine, based on a TDD uplink/downlink configuration, a downlink HARQ timing value k for transmission of downlink HARQ feedback for a downlink transmission received in a downlink TTI $n_{DL}$; and transmit, in an uplink TTI $n_{UL}=n_{DL}+k$, the downlink HARQ feedback for the downlink transmission received in the downlink TTI $n_{DL}$. For at least some combinations of values for $n_{UL}$ and TDD uplink/downlink configurations, k<4.

In some embodiments, a wireless device for a cellular communications network comprises a determining module and a transmitting module. The determining module is operable to determine, based on a TDD uplink/downlink configuration, a downlink HARQ timing value k for transmission of downlink HARQ feedback for a downlink transmission received in a downlink TTI $n_{DL}$. The transmitting module is operable to transmit, in an uplink TTI $n_{UL}=n_{DL}+k$, the downlink HARQ feedback for the downlink transmission received in the downlink TTI $n_{DL}$. For at least some combinations of values for $n_{UL}$ and TDD uplink/downlink configurations, k<4.

Embodiments of a method of operation of a radio access node in a cellular communications network are also disclosed. In some embodiments, a method of operation of a radio access node in a cellular communications network comprises transmitting a downlink transmission to a wireless device in a downlink TTI $n_{DL}$; determining, based on a TDD uplink/downlink configuration, a downlink HARQ timing value k for reception of downlink HARQ feedback from the wireless device for the downlink transmission transmitted in the downlink TTI $n_{DL}$; and receiving, in an uplink TTI $n_{UL}=n_{DL}+k$, the downlink HARQ feedback from the wireless device for the downlink transmission transmitted to the wireless device in the downlink TTI $n_{DL}$. For at least some combinations of values for $n_{UL}$ and TDD uplink/downlink configurations, k<4.

In some embodiments, the downlink HARQ timing value k is a smallest integer number of TTIs that is larger than or equal to a predefined minimum downlink HARQ timing value such that TTI $n_{DL}+k$ is an uplink TTI. Further, in some embodiments, the predefined minimum downlink HARQ timing value is 2. In some other embodiments, the predefined minimum downlink HARQ timing value is 3.

In some embodiments, determining the downlink HARQ timing value k comprises determining the downlink HARQ timing value k in such a manner that an uplink part of special subframes are treated as uplink TTIs. In some other embodiments, determining the downlink HARQ timing value k comprises determining the downlink HARQ timing value k in such a manner that an uplink part of special subframes are not treated as uplink TTIs.

In some embodiments, the TDD uplink/downlink configuration is LTE TDD uplink/downlink configuration 0, and determining the downlink HARQ timing value k comprises determining the downlink HARQ timing value k such that the downlink HARQ timing value k is 3 if $n_{UL}$ is equal to 3, the downlink HARQ timing value k is 3 if $n_{UL}$ is equal to 4, the downlink HARQ timing value k is 3 if $n_{UL}$ is equal to 8, and the downlink HARQ timing value k is 3 if $n_{UL}$ is equal to 9.

In some embodiments, the TDD uplink/downlink configuration is LTE TDD uplink/downlink configuration 1, and determining the downlink HARQ timing value k comprises determining the downlink HARQ timing value k such that the downlink HARQ timing value k is 3 or 6 if $n_{UL}$ is equal to 2, the downlink HARQ timing value k is 3 if $n_{UL}$ is equal to 3, the downlink HARQ timing value k is 3 or 6 if $n_{UL}$ is equal to 7, and the downlink HARQ timing value k is 3 if $n_{UL}$ is equal to 8.

In some embodiments, the TDD uplink/downlink configuration is LTE TDD uplink/downlink configuration 2, and determining the downlink HARQ timing value k comprises determining the downlink HARQ timing value k such that the downlink HARQ timing value k is 3, 4, 6, or 7 if $n_{UL}$ is equal to 2 and the downlink HARQ timing value k is 3, 4, 6, or 7 if $n_{UL}$ is equal to 7.

In some embodiments, the TDD uplink/downlink configuration is LTE TDD uplink/downlink configuration 3, and determining the downlink HARQ timing value k comprises determining the downlink HARQ timing value k such that the downlink HARQ timing value k is 5, 6, or 7 if $n_{UL}$ is equal to 2, the downlink HARQ timing value k is 4 or 5 if $n_{UL}$ is equal to 3, and the downlink HARQ timing value k is 3 or 4 if $n_{UL}$ is equal to 4.

In some embodiments, the TDD uplink/downlink configuration is LTE TDD uplink/downlink configuration 4, and determining the downlink HARQ timing value k comprises determining the downlink HARQ timing value k such that the downlink HARQ timing value k is 6, 7, 8, or 11 if $n_{UL}$ is equal to 2 and the downlink HARQ timing value k is 3, 4, 5, or 6 if $n_{UL}$ is equal to 3.

In some embodiments, the TDD uplink/downlink configuration is LTE TDD uplink/downlink configuration 5, and determining the downlink HARQ timing value k comprises determining the downlink HARQ timing value k such that the downlink HARQ timing value k is 3, 4, 5, 6, 7, 8, 9, 11, or 12 if $n_{UL}$ is equal to 2.

In some embodiments, the TDD uplink/downlink configuration is LTE TDD uplink/downlink configuration 6, and determining the downlink HARQ timing value k comprises determining the downlink HARQ timing value k such that the downlink HARQ timing value k is 3 or 6 if $n_{UL}$ is equal to 2, the downlink HARQ timing value k is 3 if $n_{UL}$ is equal to 3, the downlink HARQ timing value k is 3 if $n_{UL}$ is equal to 4, and the downlink HARQ timing value k is 3 if $n_{UL}$ is equal to 8.

In some embodiments, each of the downlink TTI and the uplink TTI is a 1 ms TTI.

Embodiments of a radio access node for a cellular communications network are also disclosed. In some embodiments, a radio access node for a cellular communications network is adapted to transmit a downlink transmission to a wireless device in a downlink TTI $n_{DL}$; determine, based on a TDD uplink/downlink configuration, a downlink HARQ timing k for reception of downlink HARQ feedback from the wireless device for the downlink transmission transmitted in the downlink TTI $n_{DL}$; and receive, in an uplink TTI $n_{UL}=n_{DL}+k$, the downlink HARQ feedback from the wireless device for the downlink transmission transmitted to the wireless device in the downlink TTI $n_{DL}$. For at least some combinations of values for $n_{UL}$ and TDD uplink/downlink configurations, k<4.

In some embodiments, the radio access node is further adapted to perform the method of operation of a radio access node according to any other embodiments of the method of operation of a radio access node disclosed herein.

In some embodiments, a radio access node for a cellular communications network comprises at least one transceiver, at least one processor, and memory comprising instructions executable by the at least one processor whereby the radio access node is operable to: transmit a downlink transmission to a wireless device in a downlink TTI $n_{DL}$; determine, based on a TDD uplink/downlink configuration, a downlink HARQ timing value k for reception of downlink HARQ feedback from the wireless device for the downlink transmission transmitted in the downlink TTI $n_{DL}$; and receive, in an uplink TTI $n_{UL}=n_{DL}+k$, the downlink HARQ feedback from the wireless device for the downlink transmission transmitted to the wireless device in the downlink TTI $n_{DL}$. For at least some combinations of values for $n_{UL}$ and TDD uplink/downlink configurations, k<4.

In some embodiments, a radio access node for a cellular communications network comprises a transmitting module, a determining module, and a receiving module. The transmitting module is operable to transmit a downlink transmission to a wireless device in a downlink TTI $n_{DL}$. The determining module is operable to determine, based on a TDD uplink/downlink configuration, a downlink HARQ timing value k for reception of downlink HARQ feedback from the wireless device for the downlink transmission transmitted in the downlink TTI $n_{DL}$. The receiving module is operable to receive, in an uplink TTI $n_{UL}=n_{DL}+k$, the downlink HARQ feedback from the wireless device for the downlink transmission transmitted to the wireless device in the downlink TTI $n_{DL}$. For at least some combinations of values for $n_{UL}$ and TDD uplink/downlink configurations, k<4.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 5 through 7 illustrate downlink HARQ timing for TDD configuration 1 according to some embodiments of the present disclosure;

FIGS. 8 through 11 illustrate downlink HARQ timing for TDD configuration 2 according to some embodiments of the present disclosure;

FIGS. 12 through 16 illustrate downlink HARQ timing for TDD configuration 3 according to some embodiments of the present disclosure;

FIGS. 17 through 21 illustrate downlink HARQ timing for TDD configuration 4 according to some embodiments of the present disclosure;

FIGS. 22 through 25 illustrate downlink HARQ timing for TDD configuration 5 according to some embodiments of the present disclosure;

FIGS. 26 through 29 illustrate downlink HARQ timing for TDD configuration 6 according to some embodiments of the present disclosure;

DETAILED DESCRIPTION

Figure 1:
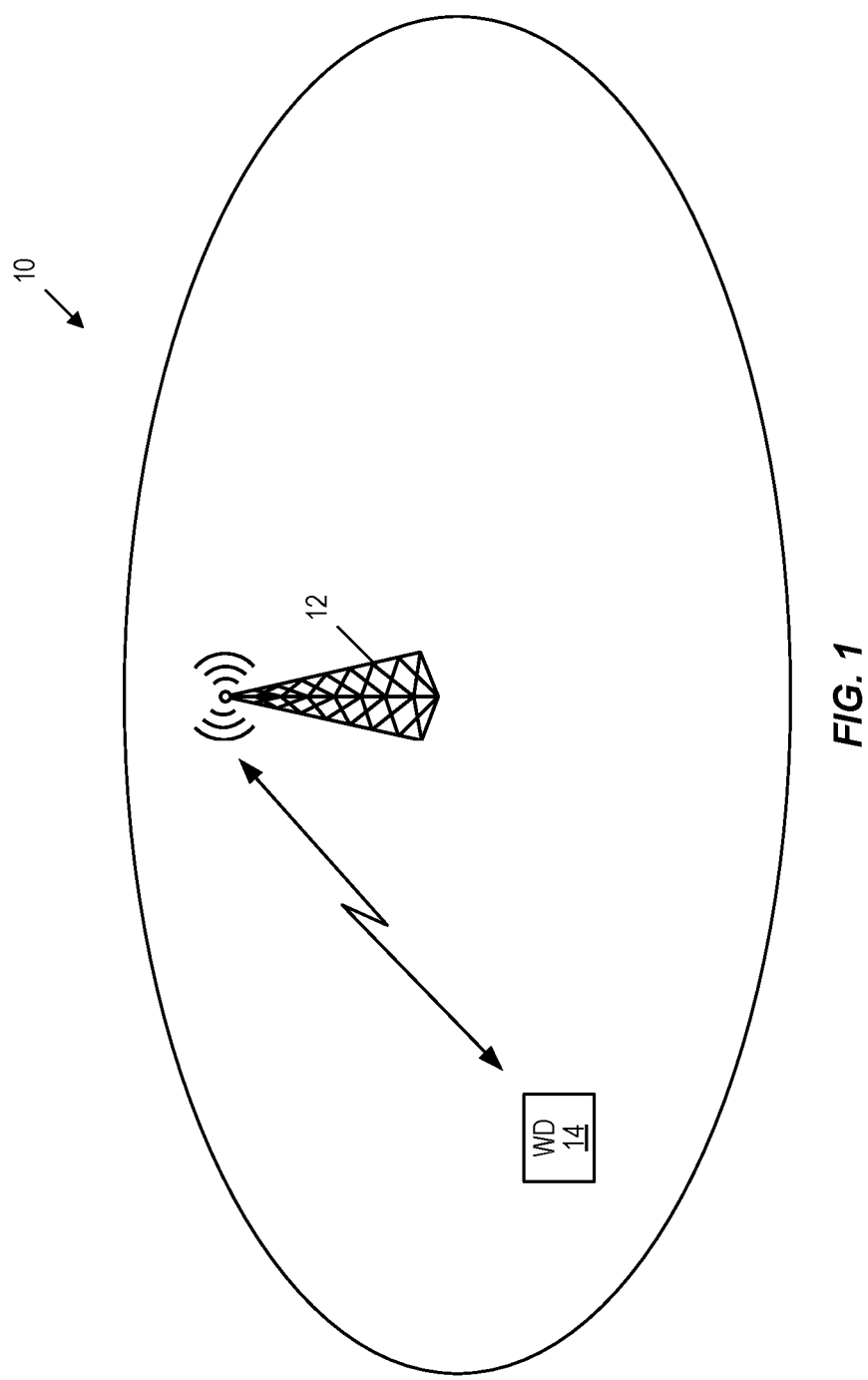
FIG. 1 illustrates one example of a cellular communications network in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Radio Node:

As used herein, a "radio node" is either a radio access node or a wireless device.

Radio Access Node:

As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a high-power or macro base station, a low-power base station (e.g., a micro base station, a pico base station, a home eNB, or the like), and a relay node.

Core Network Node:

As used herein, a "core network node" is any type of node in a Core Network (CN). Some examples of a core network node include, e.g., a Mobility Management Entity (MME), a Packet Data Network (PDN) Gateway (P-GW), a Service Capability Exposure Function (SCEF), or the like.

Wireless Device:

As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node:

As used herein, a "network node" is any node that is either part of the radio access network or the CN of a cellular communications network/system.

Note that the description given herein focuses on a 3GPP cellular communications system and, as such, 3GPP LTE terminology or terminology similar to 3GPP LTE terminology is oftentimes used. However, the concepts disclosed herein are not limited to LTE or a 3GPP system.

Note that, in the description herein, reference may be made to the term "cell;" however, particularly with respect to Fifth Generation (5G) concepts, beams may be used instead of cells and, as such, it is important to note that the concepts described herein are equally applicable to both cells and beams.

For LTE Release 15, it has been agreed to reduce the processing time to allow for shorter latency with respect to downlink Hybrid Automatic Repeat Request (HARQ) timing. UE capabilities have improved and a faster processing time can now be expected compared to that in the first release of LTE. With reduced processing time, the inventors envision that the downlink HARQ timing will be chosen between n+2 or n+3. Similarly, with reduced processing time, the inventors envision that the uplink scheduling timing (uplink grant to uplink data delay) will be chosen between n+2 or n+3.

The tables in the LTE specifications that give the downlink HARQ timing for Time Division Duplexing (TDD) do not capture the processing time reduction for downlink data to downlink HARQ feedback and for uplink grant to uplink data. These tables need to be modified to achieve lower latency.

Moreover, by introducing data transmission in Uplink Part of a Special Subframe (UpPTS), it becomes possible to transmit Physical Uplink Shared Channel (PUSCH) or Physical Uplink Control Channel (PUCCH) within the special Subframes (SFs). This implies that HARQ acknowledgement for downlink transmissions can also be transmitted in UpPTS. Therefore, a new downlink HARQ timing table needs to be defined for TDD with this enhancement of UpPTS.

Two different methods, i.e., latency optimized and load balancing, are proposed for the design of new downlink HARQ timing tables for supporting reduced processing time with 1 millisecond (ms) Transmission Time Interval (TTI) operations in TDD.

For the latency optimized approach, the HARQ acknowledgement of a downlink transport block in TTI n is transmitted in TTI n+k, where k is the smallest value larger than or equal to a predefined minimum timing (e.g., 2 or 3 ms) such that n+k is an uplink TTI.

For the load balancing approach, the downlink HARQ acknowledgments are equally distributed over different uplink TTIs.

The proposed solution provides new downlink HARQ timing tables to enable reduced processing time with 1 ms TTI in TDD. The latency optimized solution can offer the largest latency reduction gain. On the other hand, the load balancing based solution can simplify the HARQ and control design, with reduced control signaling overhead.

FIG. 1 illustrates one example of a cellular communications network 10 in which embodiments of the present disclosure may be implemented. As illustrated, the cellular communications network 10 includes a radio access node 12 (e.g., a base station or eNB) and a wireless device 14. In the embodiments described herein, the radio access node 12 and the wireless device 14 operate according to a TDD scheme in which some SFs are downlink SFs, some SFs are uplink SFs, and some SFs are special SFs. Embodiments of the present disclosure relate to downlink HARQ timing for 1 ms TTI operations in TDD.

Two different methods, i.e., latency optimized and load balancing, are proposed for the design of new downlink HARQ timing tables for supporting 1 ms TTI with reduced processing time in TDD.

It is further understood that the timing designs can be extended to support Carrier Aggregation (CA) with both Frequency Division Duplexing (FDD) and TDD carriers, among different TDD carriers, and also among Frame Structure (FS) type 3 (FS3) carriers and TDD carriers. The timing relations that will be used are formed from the design provided in the present disclosure and extended to the CA design.

In one embodiment, the timing relations are designed based on the latency optimized approach; that is, the HARQ acknowledgement of a downlink transport block in TTI n is transmitted in TTI n+k, where k is the smallest value larger than or equal to a predefined minimum timing such that n+k is an uplink TTI.

In another embodiment, the timing relations are designed based on the load balancing approach; that is, the downlink HARQ acknowledgments are equally distributed over different uplink TTIs. When designing a load balancing approach it is possible to consider that not more than four HARQ bits should be sent in a single uplink occasion. The reason for set it to four is to allow operations of feedback methods that are limited to support maximally four HARQ bits. The HARQ bits may than apply spatial bundling.

In one embodiment, the timing relations for different downlink/uplink configurations are designed based on different approaches, i.e., some downlink/uplink configurations are designed based on the latency optimization approach, while the other downlink/uplink configurations are designed based on the load balancing approach. A mixed approach is also proposed.

In one embodiment, UpPTS of the special SFs can be used for sending downlink HARQ acknowledgement, and the downlink HARQ timing for all downlink TTI transmissions are designed based on either the latency optimized approach or the load balancing approach, by treating UpPTS as an uplink TTI.

In another embodiment, UpPTS of the special SFs is not used for sending downlink HARQ acknowledgement, and the downlink HARQ timing for all downlink TTI transmissions are designed based on either the latency optimized approach or the load balancing approach, by not treating UpPTS as an uplink TTI.

In another embodiment, UpPTS of the special SFs only contains PUSCH and no PUCCH, and the eNB makes use of scheduling to receive downlink HARQ feedback in UpPTS. In this embodiment, the UE checks the scheduled PUSCH transmission in the future to identify whether to send the HARQ feedback in UpPTS or in an uplink SF.

Figure 2:
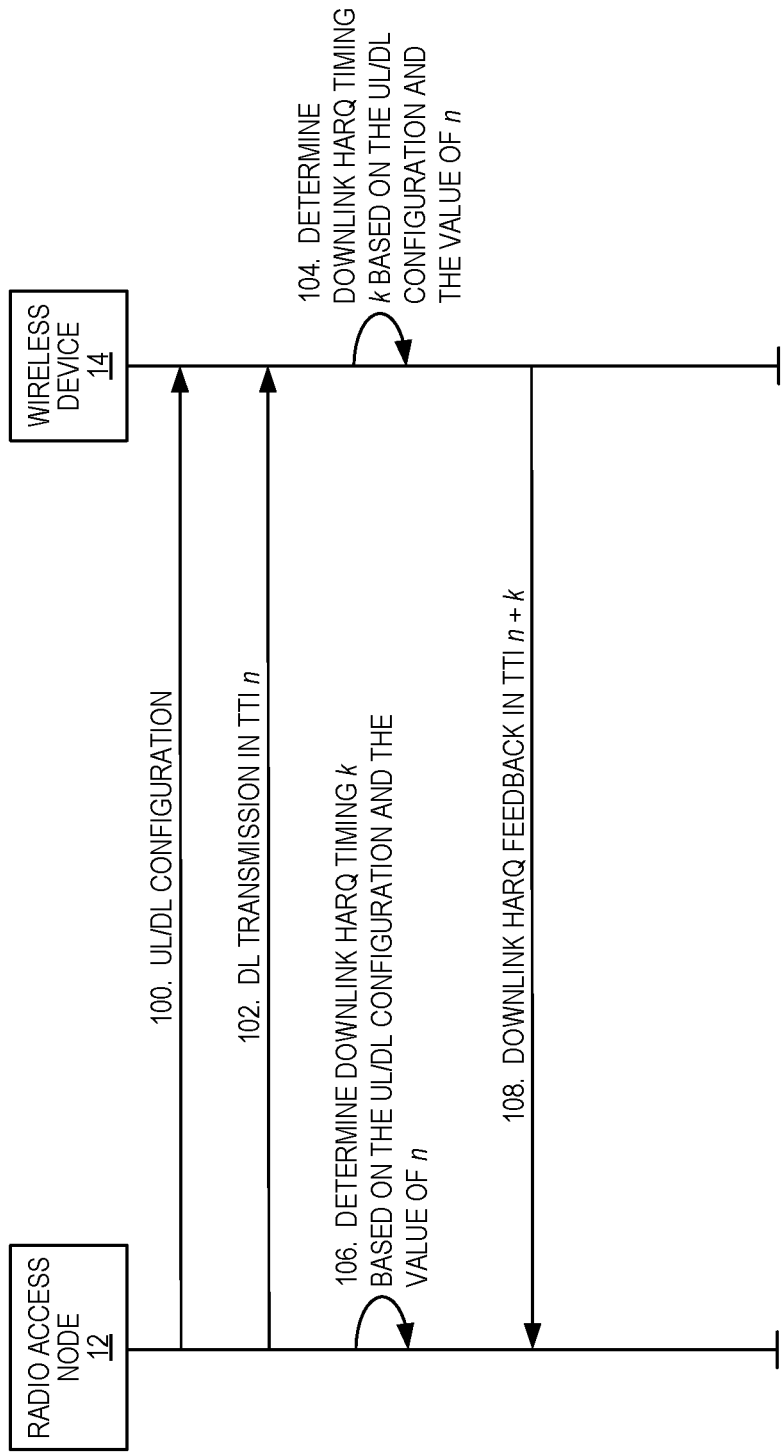
FIG. 2 illustrates the operation of the radio access node and the wireless device of FIG. 1 according to some embodiments of the present disclosure.

In this regard, FIG. 2 illustrates the operation of the radio access node 12 and the wireless device 14 according to some embodiments of the present disclosure. As illustrated, the radio access node 12 transmits (e.g., broadcasts) an uplink/downlink (UL/DL) configuration (step 100). At some point, the radio access node 12 transmits a downlink transmission to the wireless device 14 in TTI n (step 102). In other words, the radio access node 12 transmits a downlink transmission to the wireless device 14 in a TTI having a TTI index n, which is more specifically referred to herein as a TTI index $n_{DL}$. As such, the TTI index of the TTI in which the downlink transmission is transmitted is hereinafter referred to as $n_{DL}$. The wireless device 14 determines a downlink HARQ timing k for transmitting downlink HARQ feedback to the radio access node 12 based on the UL/DL configuration (step 104). In some embodiments, k<4 for at least some combinations of values for $n_{UL}$ (where again $n_{UL}=n_{DL}+k$ or equivalently $n_{DL}=n_{UL}-k$) and TDD uplink/downlink configurations, as described below in detail. As discussed herein, in some embodiments, the wireless device 14 determines the downlink HARQ timing k based on predefined tables (e.g., tables specified in a standard). As an example, the downlink HARQ timing k may be determined using the tables defined below.

For a latency optimized approach, the downlink HARQ timing k is the smallest value larger than or equal to a predefined minimum timing ($k_0$) such that $n_{DL}+k$ is an uplink TTI. In some embodiments, the predefined minimum timing $k_0$ is 2. In some other embodiments, the predefined minimum timing $k_0$ is 3.

For a load balancing approach, the downlink HARQ timing k is determined such that downlink HARQ feedback is equally distributed over different uplink TTIs. As described herein, in some embodiments, the downlink HARQ timing k is defined (e.g., by predefined tables) in accordance with the latency optimized approach for some uplink/downlink configurations and defined (e.g., by predefined tables) in accordance with the load sharing approach for other uplink/downlink configurations.

In some embodiments, the downlink HARQ timing k is determined (e.g., the predefined tables are defined) such that the UpPTS of the special SFs are used for downlink HARQ feedback (i.e., the UpPTS of the special SFs is treated as uplink TTIs). In other embodiments, the HARQ timing k is determined (e.g., the predefined tables are defined) such that the UpPTS of the special SFs are not used for downlink HARQ feedback (i.e., the UpPTS of the special SFs are not treated as uplink TTIs).

In a similar manner, the radio access node 12 also determines the downlink HARQ timing k such that the radio access node 12 knows when to expect downlink HARQ feedback from the wireless device 14 (step 106). The wireless device 14 transmits, and the radio access node 12 receives, downlink HARQ feedback in TTI $n_{DL}+k$ for the downlink transmission in step 102 (step 108). In other words, the wireless device 14 transmits, and the radio access node 12 receives, downlink HARQ feedback in a TTI having a TTI index $n_{DL}+k$. Note that this TTI in which the wireless device 14 transmits the downlink HARQ feedback is also referred to herein as a TTI having TTI index $n_{UL}$, where $n_{UL}=n_{DL}+k$.

In the following, it is shown how to derive the downlink HARQ timing tables for reduced processing time and 1 ms TTI for different downlink/uplink configurations. The HARQ acknowledgement of a downlink transport block in TTI $n_{DL}$ is transmitted in TTI $n_{DL}+k$ (i.e., in TTI $n_{UL}$, where $n_{UL}=n_{DL}+k$ or equivalently $n_{DL}=n_{UL}-k$), where k is the smallest value larger than or equal to a predefined minimum timing $k_0$ such that $n_{DL}+k$ is an uplink TTI. In the following HARQ feedback for different $k_0$ are given.

Figure 3:
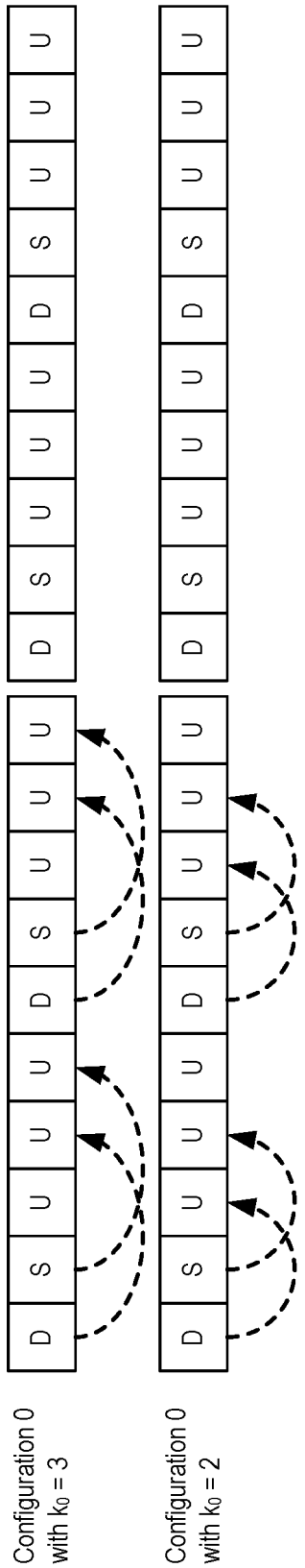
FIGS. 3 and 4 illustrate downlink Hybrid Automatic Repeat Request (HARQ) timing for Time Division Duplexing (TDD) configuration 0 according to some embodiments of the present disclosure.
Figure 4:
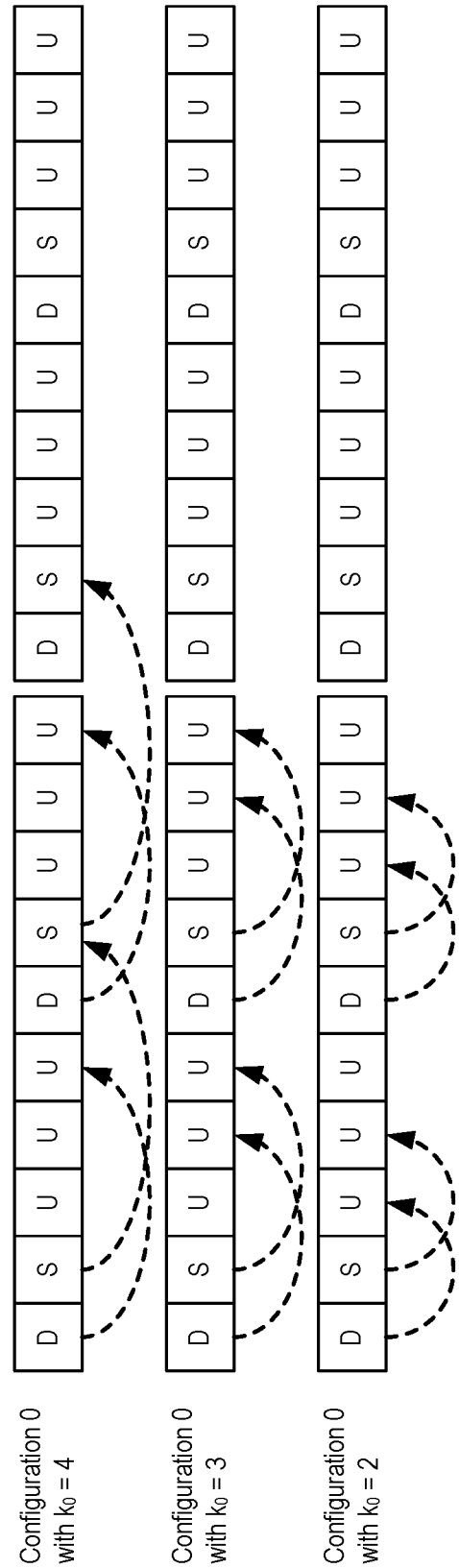

For configuration 0, the downlink HARQ timing is the same for the latency optimized approach and the load balancing approach, as shown in FIG. 3 and FIG. 4. In FIG. 3, UpPTS is not used for sending downlink HARQ feedback. In FIG. 4, UpPTS is used for sending downlink HARQ feedback. It is also observed that the downlink HARQ timing is independent of the usage of UpPTS for downlink HARQ feedback assuming a processing time $k_0$ of 2 or 3 ms. However, with the current minimum timing of 4 ms, using UpPTS for downlink HARQ feedback yields lower delays.

Figure 7:
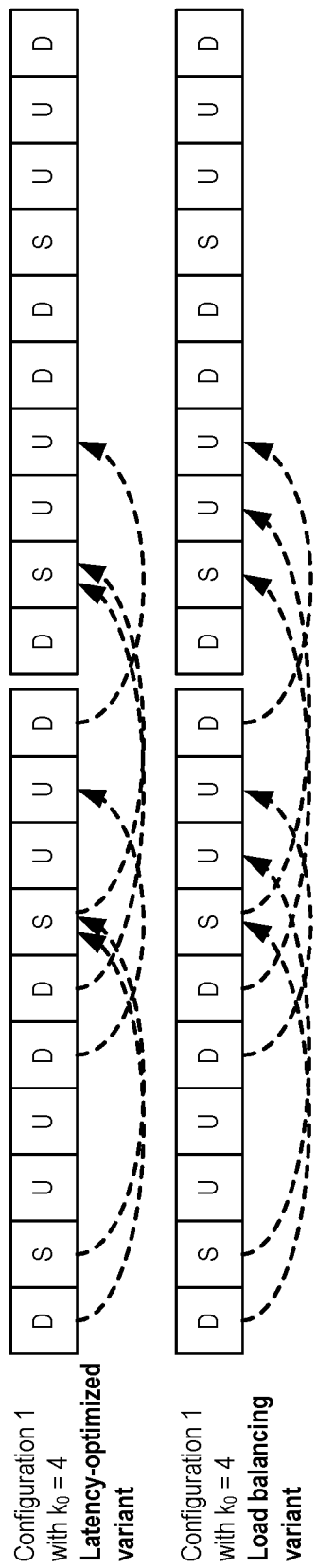

FIG. 5 and FIG. 6 show the downlink HARQ timing for TDD downlink/uplink configuration 1, for the cases of reduced processing time and without and with HARQ feedback on UpPTS, respectively. For configuration 1, the downlink HARQ timing for 1 ms TTI, reduced processing time, and no HARQ feedback in UpPTS is the same for the latency optimized approach and the load balancing approach, as shown in FIG. 5 and FIG. 6. For 1 ms TTI without reduced processing time ($k_0$=4 ms) and HARQ feedback in UpPTS, the latency optimized variant depicted in FIG. 7 leads to HARQ feedback for one downlink SF and one special SF are sent in the UpPTS part of the same uplink SF. To avoid this situation, the load balancing variant can be defined instead but it induces more delay than the latency-optimized variant.

Figure 8:
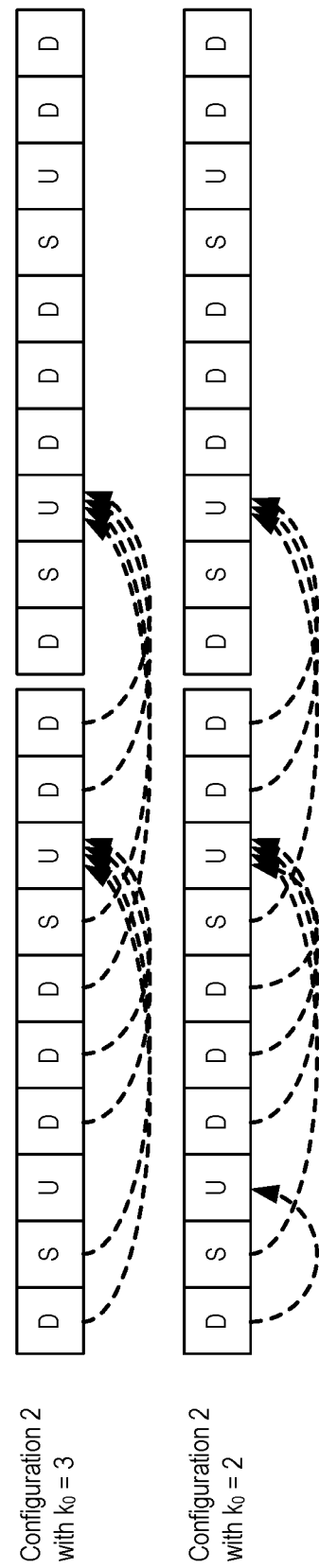

FIGS. 8 to 11 show the downlink HARQ timing for TDD downlink/uplink configuration 2 for the cases of reduced processing time and without and with HARQ feedback on UpPTS. For configuration 2, the downlink HARQ timing for 1 ms TTI, reduced processing time, and no HARQ feedback in UpPTS is the same for the latency optimized approach and the load balancing approach, as shown in FIG. 8.

Figure 9:
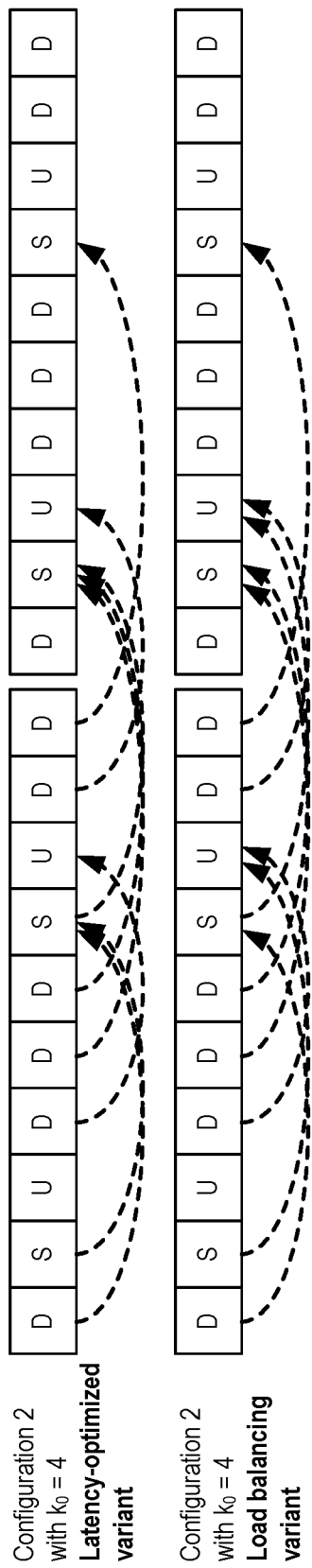
Figure 10:
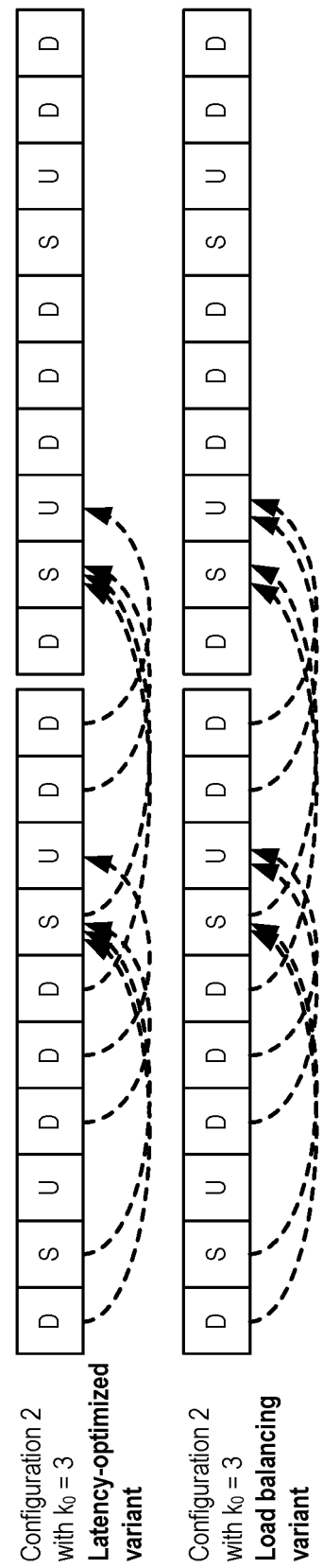
Figure 17:
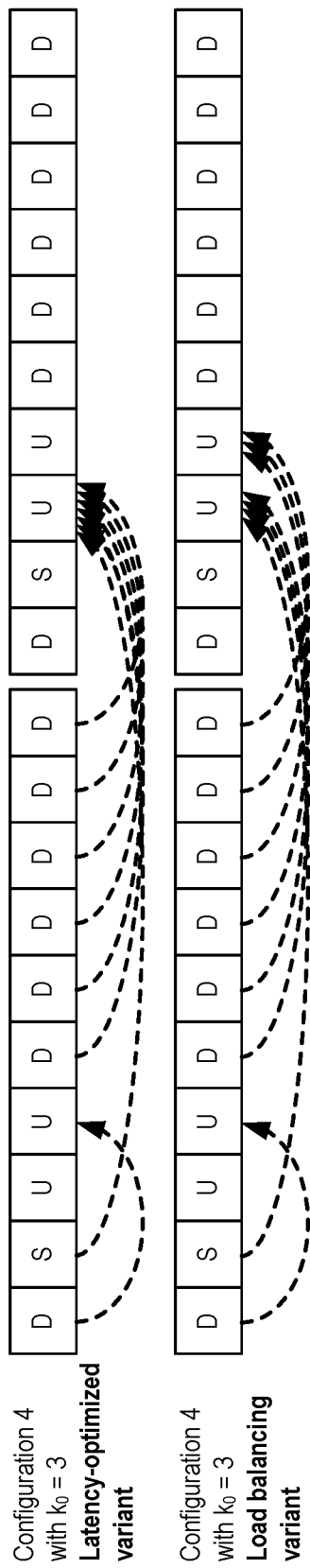
Figure 18:
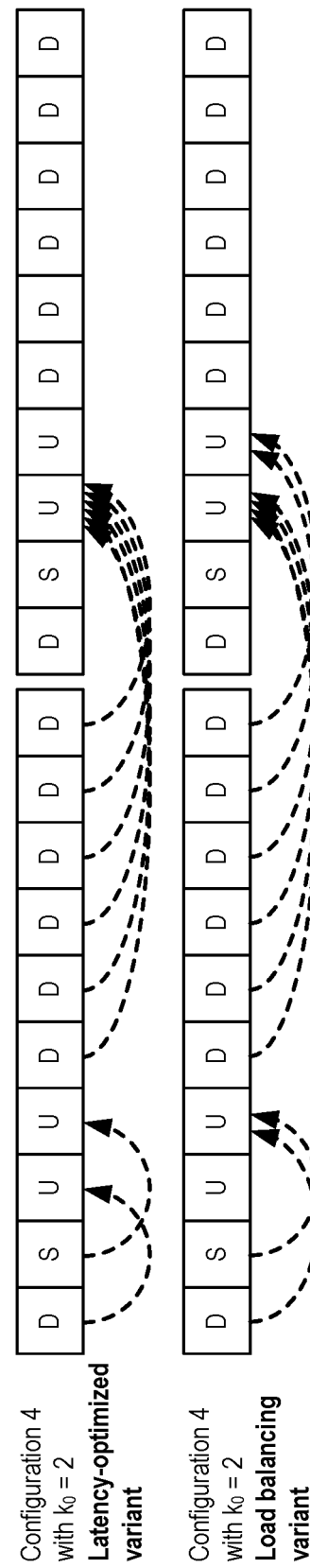

However, when HARQ feedback is possible in UpPTS, HARQ feedback is most of the time transmitted in the special SF if the latency is to be minimized (as visible in the latency-optimized variant in FIGS. 9 to 11). To move some HARQ feedback to the uplink SFs, the load balancing variant can be defined instead but it induces more delay than the latency-optimized variant.

FIGS. 12 to 16 show the downlink HARQ timing for TDD downlink/uplink configuration 3 for the cases of reduced processing time and without and with HARQ feedback on UpPTS. For configuration 3, with the latency-optimized variant, the HARQ feedback for downlink SFs concentrate in the first SF that can carry HARQ feedback. This is an uplink SF if UpPTS of special SFs cannot carry HARQ feedback, otherwise it is UpPTS. To move some HARQ feedback to the uplink SFs, the load balancing variant can be defined instead but it induces more delay than the latency-optimized variant.

Comparing the two variants in FIG. 12, it should be noted that the average delay before getting the HARQ feedback at the eNB reduced by −27.3% is achieved with the latency-optimized alternative compared to legacy HARQ timing with the $n_{DL}+4$ rule while the reduction reaches −23% with the load balancing approach. Considering this small difference in the reduced delay and the much higher HARQ feedback payload in the first uplink SF with the latency-optimized approach, the load balancing approach appears more attractive for TDD downlink/uplink configuration 3.

FIGS. 17 to 21 show the downlink HARQ timing for TDD downlink/uplink configuration 4 for the cases of reduced processing time and without and with HARQ feedback on UpPTS. For configuration 4 (similarly as for configuration 3), with the latency-optimized variant, the HARQ feedback for downlink SFs concentrate in the first SF that can carry HARQ feedback. This is an uplink SF if UpPTS of special SFs cannot carry HARQ feedback, otherwise it is UpPTS. To move some HARQ feedback to the uplink SFs, the load balancing variant can be defined instead but it induces more delay than the latency-optimized variant.

FIGS. 22 to 25 show the downlink HARQ timing for TDD downlink/uplink configuration 5 for the cases of reduced processing time and without and with HARQ feedback on UpPTS. For configuration 5, the downlink HARQ timing for 1 ms TTI, reduced processing time, and no HARQ feedback in UpPTS is the same for the latency optimized approach and the load balancing approach, as shown in FIG. 22. This is because there is a single uplink SF that can carry HARQ feedback.

Figure 25:
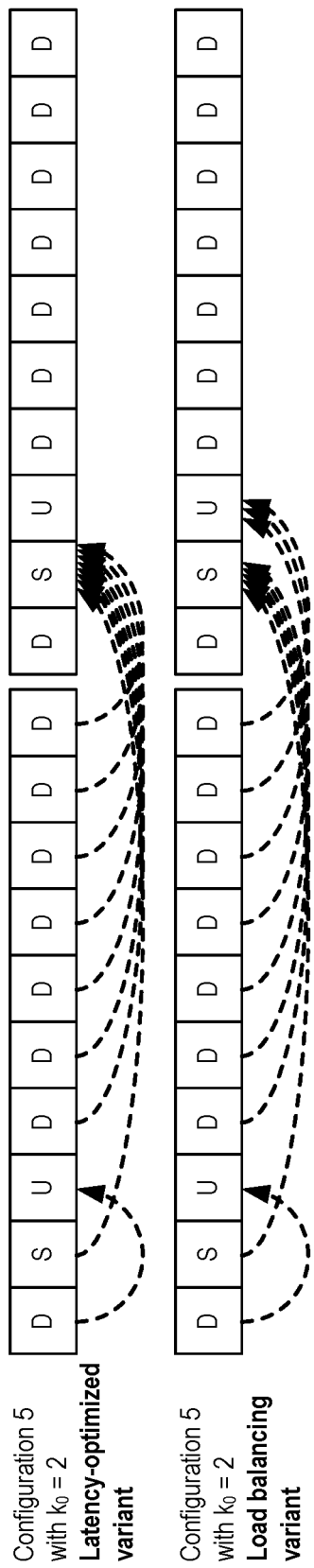

However, when HARQ feedback is possible in UpPTS, HARQ feedback is most of the time transmitted in the special SF if the latency is to be minimized (as visible in the latency-optimized variant in FIGS. 23 to 25). To move some HARQ feedback to the uplink SFs, the load balancing variant can be defined instead but it induces more delay than the latency-optimized variant.

FIGS. 26 to 29 show the downlink HARQ timing for TDD downlink/uplink configuration 6 for the cases of reduced processing time and without and with HARQ feedback on UpPTS. For configuration 6 and $k_0=3$, with the latency-optimized variant, the HARQ feedback for the last special SF and the last downlink SF of the 10 ms frame are both sent in the first uplink SF (see FIG. 26). Since there are as many uplink SFs as DL+special SFs, a load-balancing variant is able to achieve even repartition of HARQ feedback over the uplink SFs (i.e., one HARQ feedback per uplink SF). Comparing the two variants in FIG. 26, it should be noted that the average delay before getting the HARQ feedback at the eNB reduces by −45.5% with the latency-optimized variant compared to legacy HARQ timing with $k_0=4$ while it reduces by −30.3% with the load balancing variant. For TDD downlink/uplink configuration 6 the latency-optimized approach thus appears more attractive.

A similar analysis can be done for $k_0=2$. With the latency-optimized variant, the HARQ feedback for the first and the last downlink SFs of the 10 ms frame are both sent in the first uplink SF (see FIG. 27). To avoid this, a load-balancing approach can be used.

Figure 29:
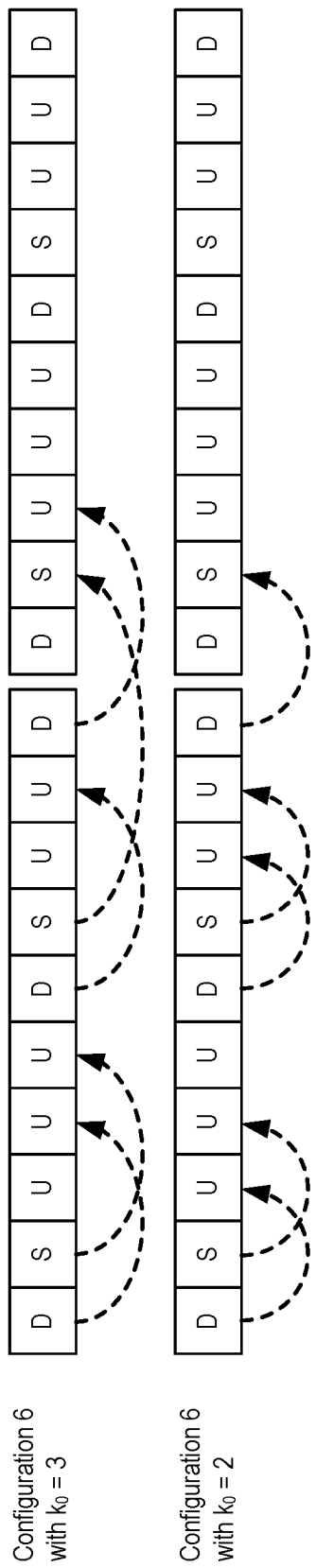

If UpPTS can carry HARQ feedback, the downlink HARQ-timing for 1 ms TTI and reduced processing time (i.e., $k_0=2$ or 3) is the same for the latency optimized approach and the load balancing approach, as shown in FIG. 29. However, with $k_0=4$, a load balancing approach and a latency-optimized approach are possible.

Based on FIGS. 3 through 29, it can be seen that both HARQ payload balancing over the available uplink SFs and the achievable reduced delay should be considered when deciding downlink HARQ timing. For instance, FIG. 13 shows an example with two alternatives for defining the downlink HARQ timing for TDD uplink/downlink configuration 3 assuming a reduced processing time $k_0=3$. With the latency-optimized alternative, the lowest latency is achieved by sending downlink HARQ feedback in the first uplink SF at or after $n+k_0$. In this example, out of the three uplink SFs of this configuration, one uplink SF carries HARQ feedback for five downlink SFs while the other two uplink SFs carry only HARQ feedback for a single downlink SF. With the load balancing alternative, a better balancing of the HARQ feedback payload over the available uplink SFs is achieved. Two uplink SFs carry HARQ feedback for two downlink SFs and one uplink SF carries HARQ feedback for three downlink SFs. If the latency-optimized alternative is used, HARQ bundling with a small short PUCCH (sPUCCH) format can be used or a large PUCCH format is needed. However, HARQ bundling of five downlink SFs may not always be a choice for minimizing latency since, if a Negative Acknowledgement (NACK) is received, all five downlink SFs need to be retransmitted causing extra delay. Another aspect to consider when deciding which alternative to choose is the actual gains in terms of latency that the latency-optimized alternative brings over the load balancing alternative. Comparing the average delay before getting the HARQ feedback at the eNB, a reduction of −27.3% and −23% is achieved with the latency-optimized alternative and the load balancing alternative, respectively, compared to legacy HARQ timing with the n+4 rule. Considering this small difference the payload balancing approach is more attractive for TDD uplink/downlink configuration 3.

Figure 26:
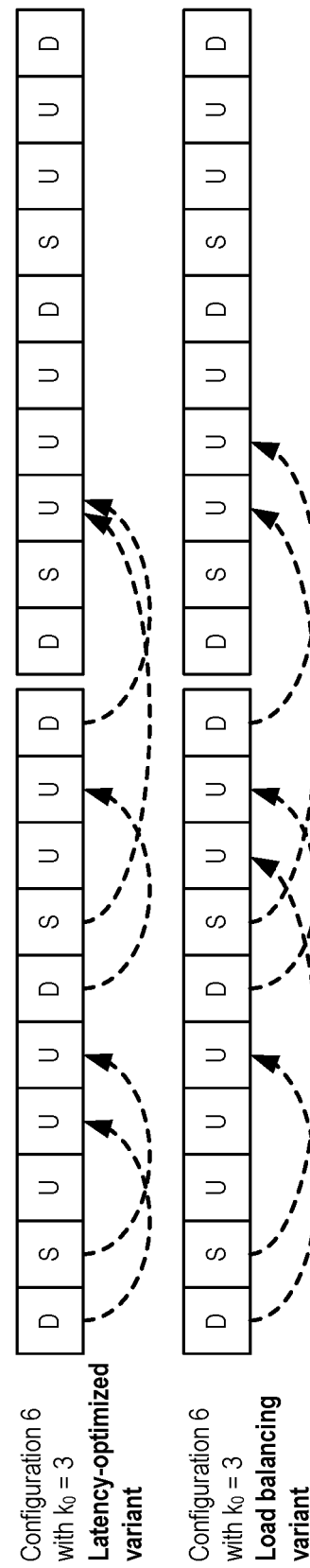

However, a payload balancing approach does not always provide advantages over the latency-optimized approach. Considering TDD uplink/downlink configuration 6 for instance, FIG. 26 shows that, in the latency-optimized approach with $k_0=3$, an uplink SF carries HARQ feedback for at most two downlink SFs which can well be handled with HARQ bundling. In addition, the average delay before getting the HARQ feedback at the eNB reduces by −45.5% with the latency-optimized alternative compared to legacy HARQ timing while it reduces by −30.3% with the load balancing alternative. For TDD uplink/downlink configuration 6, the latency-optimized approach is more attractive. So, a case-by-case analysis is required to choose between latency-optimized approach and payload balancing approach.

Another aspect to consider is the need to change the HARQ timing for all TDD uplink/downlink configurations. For instance, for TDD uplink/downlink configuration 5, changing the HARQ timing to capture the reduced processing time has only minor impact as there is a single uplink SF per 10 ms frame that can carry HARQ feedback. The average delay before getting the HARQ feedback at the eNB would only reduce by −13.3% with $k_0=3$ compared to legacy HARQ timing.

In the following description, the downlink HARQ timing for different downlink/uplink configurations are summarized into tables. Note that, for all examples shown in this section, the minimum timing for downlink HARQ feedback is assumed to be three times of the TTI length ($k_0=3$). The tables will look different when the minimum timing is different. However, in that case the tables for $k_0=2$ can be created from FIGS. 3 through 29 described above.

For the case where UpPTS is not used to transmit HARQ feedback, a table is provided that selects the most suitable approach between the latency-optimized one and the load-balancing one for a given TDD uplink/downlink configuration. As discussed previously, the delay reduction before getting the HARQ feedback does not always justify the higher payload of HARQ feedback in certain uplink SFs with an uplink/downlink configuration. There is a trade-off between these aspects.

Assuming that UpPTS is not used for sending downlink HARQ feedback, Table 8 and Table 9 give the corresponding downlink association tables for 1 ms TTI and $k_0=3$. The number of elements in a set K corresponds to the number of downlink transmissions that should be acknowledged within the uplink short TTI (sTTI). Note that the tables below should be read as follows. For a given TDD uplink/downlink configuration, the uplink SF $n_{UL}$ should carry the HARQ feedback of the downlink SFs $n_{UL}-k$, where k belongs to $K=\{k_0, k_1, \ldots k_{M-1}\}$. In other words, the tables include the values of k for each combination of TDD uplink/downlink configuration and value of $n_{UL}$.

TABLE 6

Downlink Association Set Index K: $\{k_0, k_1, \ldots k_{M-1}\}$ for TDD with 1 ms TTI and Reduced Processing Time $k_0 = 3$ (Latency Optimized, UpPTS Not Used for HARQ Feedback)

| UL/DL Config- | Subframe n (i.e., uplink subframe $n_{UL}$) | | | | | | | | | |
|---|---|---|---|---|---|---|---|---|---|---|
| uration | 0 | 1 | 2 | 3 | 4 | 5 | 6 | 7 | 8 | 9 |
| 0 | — | — | — | 3 | 3 | — | — | — | 3 | 3 |
| 1 | — | — | 3, 6 | 3 | — | — | — | 3, 6 | 3 | — |
| 2 | — | — | 3, 4, 6, 7 | — | — | — | — | 3, 4, 6, 7 | — | — |
| 3 | — | — | 3, 4, 5, 6, 7 | 3 | 3 | — | — | — | — | — |
| 4 | — | — | 3, 4, 5, 6, 7, 8, 11 | 3 | — | — | — | — | — | — |
| 5 | — | — | 3, 12, 9, 8, 7, 5, 4, 11, 6 | — | — | — | — | — | — | — |
| 6 | — | — | 3, 6 | 3 | 3 | — | — | — | 3 | — |

TABLE 7

Downlink Association Set Index K: $\{k_0, k_1, \ldots k_{M-1}\}$ for TDD with 1 ms TTI and Reduced Processing Time $k_0 = 3$ (Load Balancing, UpPTS Not Used for HARQ Feedback)

| UL/DL Config- | Subframe n (i.e., uplink subframe $n_{UL}$) | | | | | | | | | |
|---|---|---|---|---|---|---|---|---|---|---|
| uration | 0 | 1 | 2 | 3 | 4 | 5 | 6 | 7 | 8 | 9 |
| 0 | — | — | — | 3 | 3 | — | — | — | 3 | 3 |
| 1 | — | — | 3, 6 | 3 | — | — | — | 3, 6 | 3 | — |

TABLE 7-continued

Downlink Association Set Index K: $\{k_0, k_1, \ldots k_{M-1}\}$ for TDD with 1 ms TTI and Reduced Processing Time $k_0 = 3$ (Load Balancing, UpPTS Not Used for HARQ Feedback)

| UL/DL Config- | Subframe n (i.e., uplink subframe $n_{UL}$) | | | | | | | | | |
|---|---|---|---|---|---|---|---|---|---|---|
| uration | 0 | 1 | 2 | 3 | 4 | 5 | 6 | 7 | 8 | 9 |
| 2 | — | — | 3, 4, 6, 7 | — | — | — | — | 3, 4, 6, 7 | — | — |
| 3 (alternative) | | | | | | | | | | |
| 4 | — | — | 5, 6, 7 | 3, 5 | 3, 5 | — | — | — | — | — |
| 4 | — | — | 6, 7, 8, 11 | 3, 4, 5, 6 | — | — | — | — | — | — |
| 5 | — | — | 3, 12, 9, 8, 7, 5, 4, 11, 6 | — | — | — | — | — | — | — |
| 6 | — | — | 6 | 4 | 4 | — | — | 6 | 3 | — |

TABLE 8

Downlink Association Set Index K: $\{k_0, k_1, \ldots k_{M-1}\}$ for TDD with 1 ms TTI and Reduced Processing Time $k_0 = 3$ (Trade-Off Between Latency-Optimized and Load-Balancing Approaches, UpPTS Not Used for HARQ Feedback)

| UL/DL Config- | Subframe n (i.e., uplink subframe $n_{UL}$) | | | | | | | | | |
|---|---|---|---|---|---|---|---|---|---|---|
| uration | 0 | 1 | 2 | 3 | 4 | 5 | 6 | 7 | 8 | 9 |
| 0 | — | — | — | 3 | 3 | — | — | — | 3 | 3 |
| 1 | — | — | 3, 6 | 3 | — | — | — | 3, 6 | 3 | — |
| 2 | — | — | 3, 4, 6, 7 | — | — | — | — | 3, 4, 6, 7 | — | — |
| 3 | — | — | 5, 6, 7 | 4, 5 | 3, 4 | — | — | — | — | — |
| 4 | — | — | 6, 7, 8, 11 | 3, 4, 5, 6 | — | — | — | — | — | — |
| 5 | — | — | 3, 12, 9, 8, 7, 5, 4, 11, 6 | — | — | — | — | — | — | — |
| 6 | — | — | 3, 6 | 3 | 3 | — | — | — | 3 | — |

Assuming that UpPTS is used for sending downlink HARQ feedback, Table 9 and Table 10 give the corresponding downlink association tables. The number of elements in a set k corresponds to the number of downlink transmissions that should be acknowledged within the uplink sTTI.

TABLE 9

Downlink Association Set Index K: $\{k_0, k_1, \ldots k_{M-1}\}$ for TDD with 1 ms TTI and Reduced Processing Time $k_0 = 3$ (Latency Optimized Approach, UpPTS is Used for HARQ Feedback)

| UL/DL Config- | Subframe n (i.e., uplink subframe $n_{UL}$) | | | | | | | | | |
|---|---|---|---|---|---|---|---|---|---|---|
| uration | 0 | 1 | 2 | 3 | 4 | 5 | 6 | 7 | 8 | 9 |
| 0 | — | — | — | 3 | 3 | — | — | — | 3 | 3 |
| 1 | — | 5 | 3 | 3 | — | — | 5 | 3 | 3 | — |
| 2 | — | 3, 5, 6 | 3 | — | — | — | 3, 5, 6 | 3 | — | — |
| 3 | — | 3, 4, 5, 6 | 3 | 3 | 3 | — | — | — | — | — |
| 4 | — | 3, 4, 5, 6, 7, 10 | 3 | 3 | — | — | — | — | — | — |
| 5 | — | 3, 4, 5, 6, 7, 8, 10, 11 | 3 | — | — | — | — | — | — | — |
| 6 | — | 5 | 3 | 3 | 3 | — | — | — | 3 | — |

TABLE 10

Downlink Association Set Index K: {k₀, k₁, ... k_{M−1}}
for TDD with 1 ms TTI and Reduced Processing Time k₀ =
3 (Load Balancing Approach, UpPTS is Used for HARQ Feedback)

| UL/DL Config-uration | Subframe n (i.e., uplink subframe $n_{UL}$) | | | | | | | | | |
|---|---|---|---|---|---|---|---|---|---|---|
| | 0 | 1 | 2 | 3 | 4 | 5 | 6 | 7 | 8 | 9 |
| 0 | — | — | — | 3 | 3 | — | — | — | 3 | 3 |
| 1 | — | 5 | 3 | 3 | — | — | 5 | 3 | 3 | — |
| 2 | — | 5, 6 | 3, 4 | — | — | — | 5, 6 | 3, 4 | — | — |
| 3 | — | 5, 6 | 4, 5 | 3, 4 | 3 | — | — | — | — | — |
| 4 | — | 7, 10 | 5, 6, 7 | 3, 4, 5 | — | — | — | — | — | — |
| 5 | — | 6, 7, 8, 10, 11 | 3, 4, 5, 6 | — | — | — | — | — | — | — |
| 6 | — | 5 | 3 | 3 | 3 | — | — | — | 3 | — |

Figure 30:
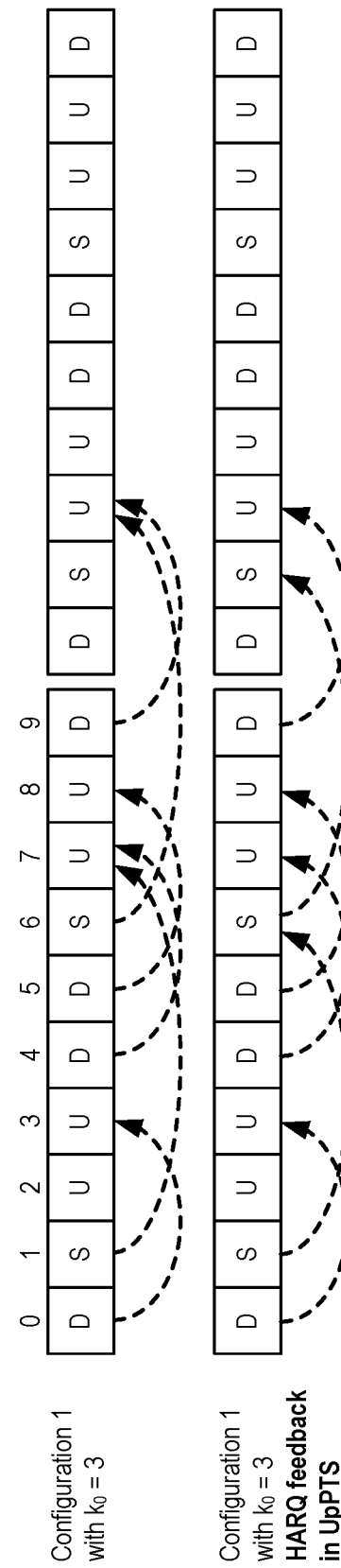
FIG. 30 illustrates one example in which the Uplink Part of a Special Subframe (UpPTS) contains only an uplink shared channel and no uplink control channel according to some embodiments of the present disclosure.

The enhancement of UpPTS may only contain the transmission of PUSCH (data transmission) and no PUCCH (no control information). In that case, to achieve lower delay to get the downlink HARQ feedback, the eNB schedules PUSCH transmission in UpPTS when expecting that the HARQ feedback would be ready earlier. An example is given in FIG. 30. As seen, the feedback for the downlink transmission in SF 1 occurs in uplink SF 7 if UpPTS cannot be used to transmit HARQ feedback while it is transmitted in SF 6 otherwise. When UpPTS can be used to transmit HARQ feedback this has two advantages in the example given in FIG. 30: 1. Lower delay for obtaining HARQ feedback; 2. No multiplexing of HARQ feedback in the same uplink transmission.

To be able to receive HARQ feedback for the downlink transmission of SF 1 in UpPTS even though UpPTS does not contain PUCCH, the eNB schedules PUSCH transmission in SF 6. The UE behavior is as follows. There is always a delay between uplink grant and uplink data transmission and between downlink data reception and downlink HARQ feedback transmission. The UE is thus aware what uplink transmission is planned in the future and what it contains (data only, HARQ feedback only, or both). At the time where the downlink data transmission is received, e.g. SF 1 in the example of FIG. 30, the UE has to check if PUSCH has been scheduled for the special SF preceding the uplink SF where it is supposed to send the HARQ feedback. If so, the HARQ feedback is sent in UpPTS of this special SF. If not, the HARQ feedback is sent in the expected uplink SF.

Figure 31:
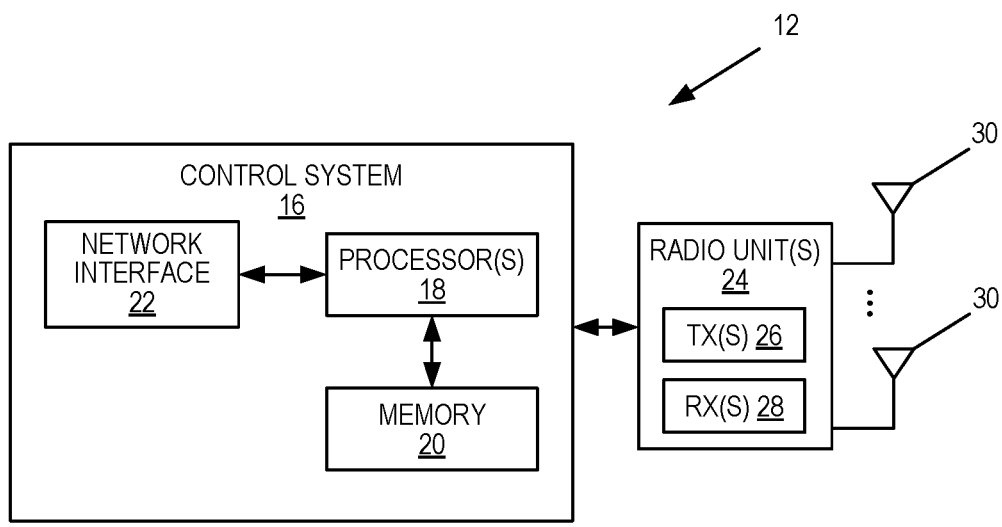
FIGS. 31 through 33 illustrate embodiments of a radio access node.

FIG. 31 is a schematic block diagram of the radio access node 12 according to some embodiments of the present disclosure. As illustrated, the radio access node 12 includes a control system 16 that includes one or more processors 18 (e.g., Central Processing Units (CPUs), Application Specific Integrated Circuits (ASICs), Field Programmable Gate Arrays (FPGAs), and/or the like), memory 20, and a network interface 22. In addition, the radio access node 12 includes one or more radio units 24 that each includes one or more transmitters 26 and one or more receivers 28 coupled to one or more antennas 30. In some embodiments, the radio unit(s) 24 is external to the control system 16 and connected to the control system 16 via, e.g., a wired connection (e.g., an optical cable). However, in some other embodiments, the radio unit(s) 24 and potentially the antenna(s) 30 are integrated together with the control system 16. The one or more processors 18 operate to provide one or more functions of a radio access node 12 as described herein. In some embodiments, the function(s) are implemented in software that is stored, e.g., in the memory 20 and executed by the one or more processors 18.

Figure 32:
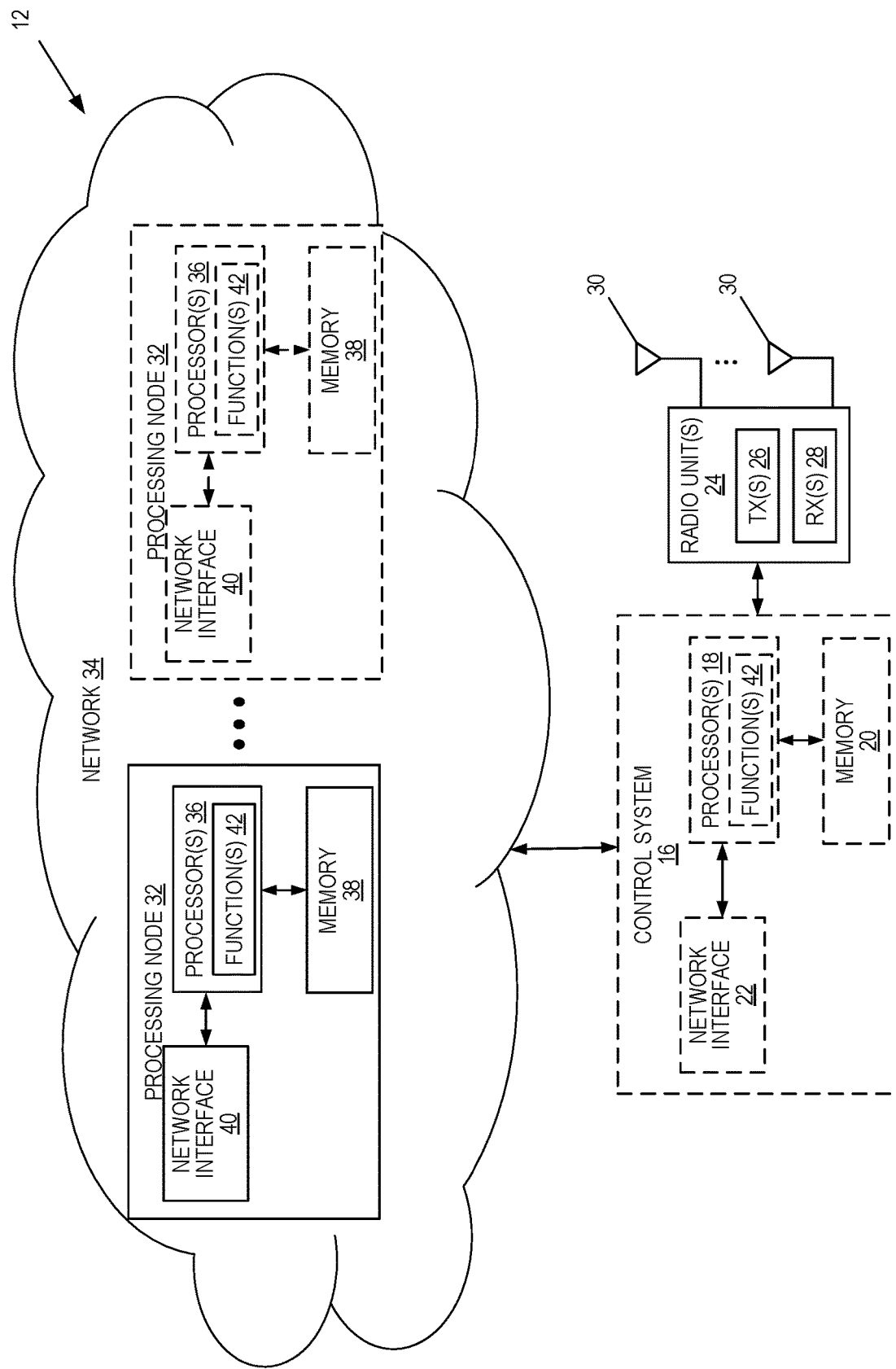

FIG. 32 is a schematic block diagram that illustrates a virtualized embodiment of the radio access node 12 according to some embodiments of the present disclosure. This discussion is equally applicable to other types of network nodes. Further, other types of network nodes may have similar virtualized architectures.

As used herein, a "virtualized" radio access node 12 is an implementation of the radio access node 12 in which at least a portion of the functionality of the radio access node 12 is implemented as a virtual component(s) (e.g., via a virtual machine(s) executing on a physical processing node(s) in a network(s)). As illustrated, in this example, the radio access node 12 includes the control system 16 (optional) that includes the one or more processors 18 (e.g., CPUs, ASICs, FPGAs, and/or the like), the memory 20, and the network interface 22 and the one or more radio units 24 that each includes the one or more transmitters 26 and the one or more receivers 28 coupled to the one or more antennas 30, as described above. The control system 16 is connected to the radio unit(s) 24 via, for example, an optical cable or the like. The control system 16 is connected to one or more processing nodes 32 coupled to or included as part of a network(s) 34 via the network interface 22. Each processing node 32 includes one or more processors 36 (e.g., CPUs, ASICs, FPGAs, and/or the like), memory 38, and a network interface 40.

In this example, functions 42 of the radio access node 12 described herein are implemented at the one or more processing nodes 32 or distributed across the control system 16 and the one or more processing nodes 32 in any desired manner. In some particular embodiments, some or all of the functions 42 of the radio access node 12 described herein are implemented as virtual components executed by one or more virtual machines implemented in a virtual environment(s) hosted by the processing node(s) 32. As will be appreciated by one of ordinary skill in the art, additional signaling or communication between the processing node(s) 32 and the control system 16 is used in order to carry out at least some of the desired functions 42. Notably, in some embodiments, the control system 16 may not be included, in which case the radio unit(s) 24 communicate directly with the processing node(s) 32 via an appropriate network interface(s).

In some embodiments, a computer program including instructions which, when executed by at least one processor, causes the at least one processor to carry out the functionality of a radio access node 12 or a node (e.g., a processing node 32) implementing one or more of the functions 42 of the radio access node 12 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 33:
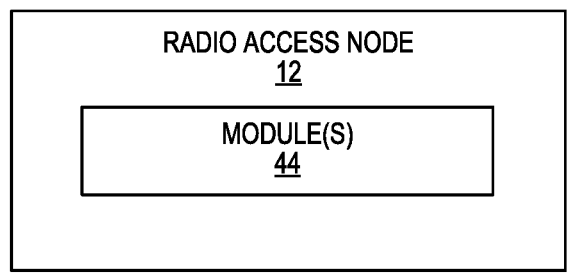

FIG. 33 is a schematic block diagram of the radio access node 12 according to some other embodiments of the present disclosure. The radio access node 12 includes one or more modules 44, each of which is implemented in software. The module(s) 44 provide the functionality of the radio access node 12 described herein. This discussion is equally applicable to the processing node 32 of FIG. 32 where the modules 44 may be implemented at one of the processing nodes 32 or distributed across multiple processing nodes 32 and/or distributed across the processing node(s) 32 and the control system 16.

Figure 34:
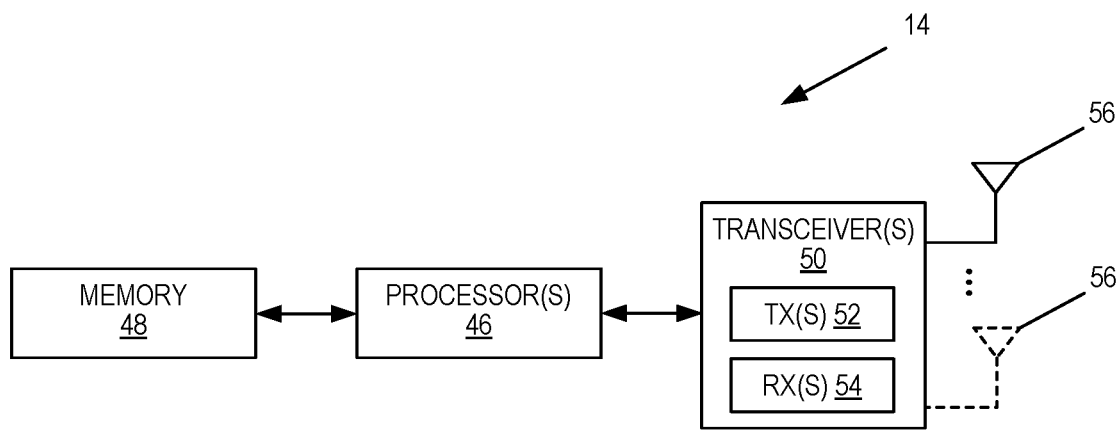
FIGS. 34 and 35 illustrate embodiments of a wireless device.

FIG. 34 is a schematic block diagram of a wireless device 14 according to some embodiments of the present disclosure. As illustrated, the wireless device 14 includes one or more processors 46 (e.g., CPUs, ASICs, FPGAs, and/or the like), memory 48, and one or more transceivers 50 each including one or more transmitters 52 and one or more receivers 54 coupled to one or more antennas 56. In some embodiments, the functionality of the wireless device 14 described above may be fully or partially implemented in software that is, e.g., stored in the memory 48 and executed by the processor(s) 46.

In some embodiments, a computer program including instructions which, when executed by at least one processor, causes the at least one processor to carry out the functionality of the wireless device 14 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 35:
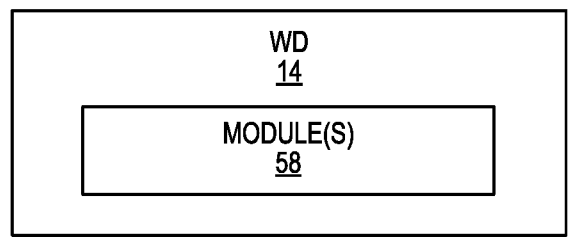

FIG. 35 is a schematic block diagram of the wireless device 14 according to some other embodiments of the present disclosure. The wireless device 14 includes one or more modules 58, each of which is implemented in software. The module(s) 58 provide the functionality of the wireless device 14 described herein.

While not being limited thereto, some example embodiments of the present disclosure are provided below.

Embodiment 1

A method of operation of a wireless device (14) in a cellular communications network (10), comprising: determining (104) a downlink HARQ timing k for transmission of downlink HARQ feedback for a downlink transmission received in a downlink TTI n based on a TDD uplink/downlink configuration; and transmitting (108), in an uplink TTI n+k, downlink HARQ feedback for the downlink transmission received in the downlink TTI n.

Embodiment 2

The method of embodiment 1 wherein k<4.

Embodiment 3

The method of embodiment 1 or 2 wherein the downlink HARQ timing k is a smallest integer number of TTIs that is larger than or equal to a predefined minimum downlink HARQ timing value such that TTI n+k is an uplink TTI.

Embodiment 4

The method of embodiment 1 or 2 wherein determining (104) the downlink HARQ timing k comprises determining (104) the downlink HARQ timing k in accordance with a load balancing scheme.

Embodiment 5

The method of any one of embodiments 1 to 4 wherein determining (104) the downlink HARQ timing k comprises determining (104) the downlink HARQ timing k in such a manner that an uplink part of special SFs are treated as uplink TTIs.

Embodiment 6

The method of any one of embodiments 1 to 4 wherein determining (104) the downlink HARQ timing k comprises determining (104) the downlink HARQ timing k in such a manner that an uplink part of special SFs are not treated as uplink TTIs.

Embodiment 7

The method of embodiment 1 or 2 wherein determining (104) the downlink HARQ timing k comprises determining (104) the downlink HARQ timing k based on a predefined table that defines values of k for different values of n for the TDD uplink/downlink configuration.

Embodiment 8

The method of embodiment 7 wherein the predefined table defines the values of k for the different values of n for the TDD uplink/downlink configuration in such a manner that an uplink part of special SFs are treated as uplink TTIs.

Embodiment 9

The method of embodiment 7 wherein the predefined table defines the values of k for the different values of n for the TDD uplink/downlink configuration in such a manner that an uplink part of special SFs are not treated as uplink TTIs.

Embodiment 10

The method of any one of embodiments 7 to 9 wherein the predefined table defines the values of k for the different values of n in accordance with a latency optimization scheme.

Embodiment 11

The method of any one of embodiments 7 to 9 wherein the predefined table defines the values of k for different values of n in accordance with a load balancing scheme.

Embodiment 12

The method of any one of the preceding embodiments wherein an uplink TTI can carry downlink HARQ feedback for the downlink transmission received in multiple TTIs.

Embodiment 13

A wireless device (14) in a cellular communications network (10), the wireless device (14) adapted to: determine a downlink HARQ timing k for transmission of downlink HARQ feedback for a downlink transmission received in a downlink TTI n based on a TDD uplink/downlink configuration; and transmit, in an uplink TTI n+k, downlink HARQ feedback for the downlink transmission received in the TTI n.

Embodiment 14

The wireless device (14) of embodiment 13 wherein the wireless device (14) is further adapted to perform the method of any one of embodiments 2 to 12.

Embodiment 15

A wireless device (14) in a cellular communications network (10), comprising: at least one transceiver (50); at least one processor (46); and memory (48) comprising instructions executable by the at least one processor (46) whereby the wireless device (14) is operable to: determine a downlink HARQ timing k for transmission of downlink HARQ feedback for a downlink transmission received in a downlink TTI n based on a TDD uplink/downlink configuration; and transmit, in an uplink TTI n+k, downlink HARQ feedback for the downlink transmission received in the downlink TTI n.

Embodiment 16

A wireless device (14) in a cellular communications network (10), the wireless device (14) comprising: a determining module (58) operable to determine a downlink HARQ timing k for transmission of downlink HARQ feedback for a downlink transmission received in a downlink TTI n based on a TDD uplink/downlink configuration; and a transmitting module (58) operable to transmit, in an uplink TTI n+k, downlink HARQ feedback for the downlink transmission received in the downlink TTI n.

Embodiment 17

A method of operation of a radio access node (12) in a cellular communications network (10), comprising: transmitting (102) a downlink transmission to a wireless device (14) in a downlink TTI n; determining (106), based on a TDD uplink/downlink configuration, a downlink HARQ timing k for reception of downlink HARQ feedback from the wireless device (14) for the downlink transmission transmitted in the downlink TTI n; and receiving (108), in an uplink TTI n+k, downlink HARQ feedback from the wireless device (14) for the downlink transmission transmitted to the wireless device (14) in the downlink TTI n.

The following acronyms are used throughout this disclosure.

3GPP Third Generation Partnership Project
5G Fifth Generation
ASIC Application Specific Integrated Circuit
BLER Block Error Rate
CA Carrier Aggregation
CN Core Network
CPU Central Processing Unit
DCI Downlink Control Information
DwPTS Downlink Part of a Special Subframe
eNB Enhanced or Evolved Node B
FDD Frequency Division Duplexing
FPGA Field Programmable Gate Array
FS Frame Structure
GP Guard Period
HARQ Hybrid Automatic Repeat Request
HTTP Hypertext Transfer Protocol
LAA License Assisted Access
LTE Long Term Evolution
LSB Least Significant Bit
MME Mobility Management Entity
ms Millisecond
MSB Most Significant Bit
MTC Machine Type Communication
NACK Negative Acknowledgement
PDN Packet Data Network
P-GW Packet Data Network Gateway
PHICH Physical Hybrid Automatic Repeat Request Indicator Channel
PUCCH Physical Uplink Control Channel
PUSCH Physical Uplink Shared Channel
RAT Radio Access Technology
SCEF Service Capability Exposure Function
SF Subframe
SIB System Information Block
sPUCCH Short Physical Uplink Control Channel
sTTI Short Transmission Time Interval
TCP Transmission Control Protocol
TDD Time Division Duplexing
TS Technical Specification
TTI Transmission Time Interval
UE User Equipment
UI Uplink Index
UpPTS Uplink Part of a Special Subframe Those skilled in the art will recognize improvements and modifications to the embodiments of the present disclosure. All such improvements and modifications are considered within the scope of the concepts disclosed herein and the claims that follow.

What is claimed is:

1. A method of operation of a wireless device in a cellular communications network comprising a Time Division Duplexing, TDD, cell, the method comprising:
    determining, based on a TDD uplink/downlink configuration of the TDD cell, a downlink Hybrid Automatic Repeat Request, HARQ, timing value k for transmission of downlink HARQ feedback for a downlink transmission received via the TDD cell in a downlink Transmission Time Interval, TTI, $n_{DL}$; and
    transmitting, via the TDD cell and in an uplink TTI $n_{UL}=n_{DL}+k$, the downlink HARQ feedback for the downlink transmission received via the TDD cell in the downlink TTI $n_{DL}$;
    wherein, for at least some combinations of values for $n_{UL}$ and TDD uplink/downlink configurations, k<4.

2. The method of claim 1 wherein the downlink HARQ timing value k is a smallest integer number of TTIs that is larger than or equal to a predefined minimum downlink HARQ timing value to cause TTI $n_{DL}+k$ to fall within an uplink TTI.

3. The method of claim 2 wherein the predefined minimum downlink HARQ timing value is 2.

4. The method of claim 2 wherein the predefined minimum downlink HARQ timing value is 3.

5. The method of claim 1 wherein determining the downlink HARQ timing value k comprises determining the downlink HARQ timing value k to cause an uplink part of special subframes having an uplink part and a downlink part to be treated as uplink TTIs.

6. The method of claim 1 wherein determining the downlink HARQ timing value k comprises determining the downlink HARQ timing value k to cause an uplink part of special subframes having an uplink part and a downlink part not to be treated as uplink TTIs.

7. The method of claim 1 wherein the TDD uplink/downlink configuration is Long Term Evolution, LTE, TDD uplink/downlink configuration 0, and determining the downlink HARQ timing value k comprises determining the downlink HARQ timing value k to be one of the following:
the downlink HARQ timing value k is 3 if $n_{UL}$ is equal to 3;
the downlink HARQ timing value k is 3 if $n_{UL}$ is equal to 4;
the downlink HARQ timing value k is 3 if $n_{UL}$ is equal to 8; and
the downlink HARQ timing value k is 3 if $n_{UL}$ is equal to 9.

8. The method of claim 1 wherein the TDD uplink/downlink configuration is Long Term Evolution, LTE, TDD uplink/downlink configuration 1, and determining the downlink HARQ timing value k comprises determining the downlink HARQ timing value k to be one of the following:
the downlink HARQ timing value k is 3 or 6 if $n_{UL}$ is equal to 2;
the downlink HARQ timing value k is 3 if $n_{UL}$ is equal to 3;
the downlink HARQ timing value k is 3 or 6 if $n_{UL}$ is equal to 7; and
the downlink HARQ timing value k is 3 if $n_{UL}$ is equal to 8.

9. The method of claim 1 wherein the TDD uplink/downlink configuration is Long Term Evolution, LTE, TDD uplink/downlink configuration 2, and determining the downlink HARQ timing value k comprises determining the downlink HARQ timing value k to be one of the following:
the downlink HARQ timing value k is 3, 4, 6, or 7 if $n_{UL}$ is equal to 2; and
the downlink HARQ timing value k is 3, 4, 6, or 7 if $n_{UL}$ is equal to 7.

10. The method of claim 1 wherein the TDD uplink/downlink configuration is Long Term Evolution, LTE, TDD uplink/downlink configuration 3, and determining the downlink HARQ timing value k comprises determining the downlink HARQ timing value k to be one of the following:
the downlink HARQ timing value k is 5, 6, or 7 if $n_{UL}$ is equal to 2;
the downlink HARQ timing value k is 4 or 5 if $n_{UL}$ is equal to 3; and
the downlink HARQ timing value k is 3 or 4 if $n_{UL}$ is equal to 4.

11. The method of claim 1 wherein the TDD uplink/downlink configuration is Long Term Evolution, LTE, TDD uplink/downlink configuration 4, and determining the downlink HARQ timing value k comprises determining the downlink HARQ timing value k to be one of the following:
the downlink HARQ timing value k is 6, 7, 8, or 11 if $n_{UL}$ is equal to 2; and
the downlink HARQ timing value k is 3, 4, 5, or 6 if $n_{UL}$ is equal to 3.

12. The method of claim 1 wherein the TDD uplink/downlink configuration is LTE TDD uplink/downlink configuration 5, and determining the downlink HARQ timing value k comprises determining the downlink HARQ timing value k
to be 3, 4, 5, 6, 7, 8, 9, 11, or 12 if $n_{UL}$ is equal to 2.

13. The method of claim 1 wherein the TDD uplink/downlink configuration is LTE TDD uplink/downlink configuration 6, and determining the downlink HARQ timing value k comprises determining the downlink HARQ timing value k to be one of the following:
the downlink HARQ timing value k is 3 or 6 if $n_{UL}$ is equal to 2;
the downlink HARQ timing value k is 3 if $n_{UL}$ is equal to 3;
the downlink HARQ timing value k is 3 if $n_{UL}$ is equal to 4; and
the downlink HARQ timing value k is 3 if $n_{UL}$ is equal to 8.

14. The method of claim 1 wherein each of the downlink TTI and the uplink TTI is a 1 millisecond TTI.

15. A wireless device for a cellular communications network comprising a Time Division Duplexing, TDD, cell, the wireless device comprising:
at least one transceiver;
at least one processor; and
memory comprising instructions executable by the at least one processor whereby the wireless device is operable to:
determine, based on a TDD uplink/downlink configuration of the TDD cell, a downlink Hybrid Automatic Repeat Request, HARQ, timing value k for transmission of downlink HARQ feedback for a downlink transmission received via the TDD cell in a downlink Transmission Time Interval, TTI, $n_{DL}$; and
transmit, via the TDD cell and in an uplink TTI $n_{UL}=n_{DL}+k$, the downlink HARQ feedback for the downlink transmission received via the TDD cell in the downlink TTI $n_{DL}$;
wherein, for at least some combinations of values for $n_{UL}$ and TDD uplink/downlink configurations, k<4.

16. A method of operation of a radio access node in a cellular communications network comprising a Time Division Duplexing, TDD, cell, the method comprising:
transmitting, via the TDD cell, a downlink transmission to a wireless device in a downlink Transmission Time Interval, TTI, $n_{DL}$;
determining, based on a TDD uplink/downlink configuration of the TDD cell, a downlink Hybrid Automatic Repeat Request, HARQ, timing value k for reception of downlink HARQ feedback from the wireless device for the downlink transmission transmitted via the TDD cell in the downlink TTI $n_{DL}$; and
receiving, via the TDD cell and in an uplink TTI $n_{UL}=n_{DL}+k$, the downlink HARQ feedback from the wireless device for the downlink transmission transmitted via the TDD cell to the wireless device in the downlink TTI $n_{DL}$;
wherein, for at least some combinations of values for $n_{UL}$ and TDD uplink/downlink configurations, k<4.

17. The method of claim 16 wherein the downlink HARQ timing value k is a smallest integer number of TTIs that is larger than or equal to a predefined minimum downlink HARQ timing value to cause TTI $n_{DL}+k$ to fall within an uplink TTI.

18. The method of claim 17 wherein the predefined minimum downlink HARQ timing value is 2.

19. The method of claim 17 wherein the predefined minimum downlink HARQ timing value is 3.

20. The method of claim 16 wherein determining the downlink HARQ timing value k comprises determining the downlink HARQ timing value k to cause an uplink part of special subframes having an uplink part and a downlink part to be treated as uplink TTIs.

21. The method of claim 16 wherein determining the downlink HARQ timing value k comprises determining the downlink HARQ timing value k to cause an uplink part of special subframes having an uplink part and a downlink part not to be treated as uplink TTIs.

22. The method of claim 16 wherein the TDD uplink/downlink configuration is Long Term Evolution, LTE, TDD uplink/downlink configuration 0, and determining the downlink HARQ timing value k comprises determining the downlink HARQ timing value k to be one of the following:
the downlink HARQ timing value k is 3 if $n_{UL}$ is equal to 3;
the downlink HARQ timing value k is 3 if $n_{UL}$ is equal to 4;
the downlink HARQ timing value k is 3 if $n_{UL}$ is equal to 8; and
the downlink HARQ timing value k is 3 if $n_{UL}$ is equal to 9.

23. The method of claim 16 wherein the TDD uplink/downlink configuration is Long Term Evolution, LTE, TDD uplink/downlink configuration 1, and determining the downlink HARQ timing value k comprises determining the downlink HARQ timing value k to be one of the following:
the downlink HARQ timing value k is 3 or 6 if $n_{UL}$ is equal to 2;
the downlink HARQ timing value k is 3 if $n_{UL}$ is equal to 3;
the downlink HARQ timing value k is 3 or 6 if $n_{UL}$ is equal to 7; and
the downlink HARQ timing value k is 3 if $n_{UL}$ is equal to 8.

24. The method of claim 16 wherein the TDD uplink/downlink configuration is Long Term Evolution, LTE, TDD uplink/downlink configuration 2, and determining the downlink HARQ timing value k comprises determining the downlink HARQ timing value k to be one of the following:
the downlink HARQ timing value k is 3, 4, 6, or 7 if $n_{UL}$ is equal to 2; and
the downlink HARQ timing value k is 3, 4, 6, or 7 if $n_{UL}$ is equal to 7.

25. The method of claim 16 wherein the TDD uplink/downlink configuration is Long Term Evolution, LTE, TDD uplink/downlink configuration 3, and determining the downlink HARQ timing value k comprises determining the downlink HARQ timing value k to be one of the following:
the downlink HARQ timing value k is 5, 6, or 7 if $n_{UL}$ is equal to 2;
the downlink HARQ timing value k is 4 or 5 if $n_{UL}$ is equal to 3; and
the downlink HARQ timing value k is 3 or 4 if $n_{UL}$ is equal to 4.

26. The method of claim 16 wherein the TDD uplink/downlink configuration is Long Term Evolution, LTE, TDD uplink/downlink configuration 4, and determining the downlink HARQ timing value k comprises determining the downlink HARQ timing value k to be one of the following:
the downlink HARQ timing value k is 6, 7, 8, or 11 if $n_{UL}$ is equal to 2; and
the downlink HARQ timing value k is 3, 4, 5, or 6 if $n_{UL}$ is equal to 3.

27. The method of claim 16 wherein the TDD uplink/downlink configuration is Long Term Evolution, LTE, TDD uplink/downlink configuration 5, and determining the downlink HARQ timing value k comprises determining the downlink HARQ timing value k
to be 3, 4, 5, 6, 7, 8, 9, 11, or 12 if $n_{UL}$ is equal to 2.

28. The method of claim 16 wherein the TDD uplink/downlink configuration is Long Term Evolution, LTE, TDD uplink/downlink configuration 6, and determining the downlink HARQ timing value k comprises determining the downlink HARQ timing value k to be one of the following:
the downlink HARQ timing value k is 3 or 6 if $n_{UL}$ is equal to 2;
the downlink HARQ timing value k is 3 if $n_{UL}$ is equal to 3;
the downlink HARQ timing value k is 3 if $n_{UL}$ is equal to 4; and
the downlink HARQ timing value k is 3 if $n_{UL}$ is equal to 8.

29. The method of claim 16 wherein each of the downlink TTI and the uplink TTI is a 1 millisecond TTI.

30. A radio access node for a cellular communications network comprising a Time Division Duplexing, TDD, cell, the radio access node comprising:
at least one transceiver;
at least one processor; and
memory comprising instructions executable by the at least one processor whereby the radio access node is operable to:
transmit, via the TDD cell, a downlink transmission to a wireless device in a downlink Transmission Time Interval, TTI, $n_{DL}$;
determine, based on a TDD uplink/downlink configuration of the TDD cell, a downlink Hybrid Automatic Repeat Request, HARQ, timing value k for reception of downlink HARQ feedback from the wireless device for the downlink transmission transmitted via the TDD cell in the downlink TTI $n_{DL}$; and
receive, via the TDD cell and in an uplink TTI $n_{UL}=n_{DL}+k$, the downlink HARQ feedback from the wireless device for the downlink transmission transmitted via the TDD cell to the wireless device in the downlink TTI $n_{DL}$;
wherein, for at least some combinations of values for $n_{UL}$ and TDD uplink/downlink configurations, k<4.

* * * * *